United States Patent
Damnjanovic et al.

(10) Patent No.: US 10,727,983 B2
(45) Date of Patent: Jul. 28, 2020

(54) VARIABLE LENGTH TRANSMISSION TIME INTERVALS (TTI)

(71) Applicant: QUALCOMM Incorporated, San Diego, CA (US)

(72) Inventors: Jelena Damnjanovic, Del Mar, CA (US); Aleksandar Damnjanovic, Del Mar, CA (US); Madhavan Srinivasan Vajapeyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/861,662

(22) Filed: Sep. 22, 2015

(65) Prior Publication Data
US 2016/0128095 A1    May 5, 2016

Related U.S. Application Data

(60) Provisional application No. 62/069,942, filed on Oct. 29, 2014.

(51) Int. Cl.
*H04L 1/18* (2006.01)
*H04W 72/04* (2009.01)
(Continued)

(52) U.S. Cl.
CPC .......... *H04L 1/1812* (2013.01); *H04L 1/1887* (2013.01); *H04L 5/0087* (2013.01);
(Continued)

(58) Field of Classification Search
None
See application file for complete search history.

(56) References Cited

U.S. PATENT DOCUMENTS

| 7,715,847 B2 | 5/2010 | Teague |
| 8,644,292 B2 | 2/2014 | Gorokhov et al. |

(Continued)

FOREIGN PATENT DOCUMENTS

| JP | 2007300508 A | 11/2007 |
| WO | WO-2006098993 A1 | 9/2006 |

(Continued)

OTHER PUBLICATIONS

ISA/EPO, International Search Report and Written Opinion of the International Searching Authority, Intl. App. No. PCT/US2015/051764, dated Dec. 10, 2015, European Patent Office, Rijswijk, NL, 10 pgs.

*Primary Examiner* — Chi H Pham
*Assistant Examiner* — Raul Rivas
(74) *Attorney, Agent, or Firm* — Holland & Harr LLP

(57) ABSTRACT

Methods, systems, and apparatuses for enabling and utilizing variable length transmission time intervals (TTI) are described. Latency for communications between base stations and user equipment (UEs) may be reduced by flexibly and dynamically adapting to data traffic needs. TTI for a given UE may be dynamically adjusted according to UE or system requirements and the configuration of uplink and downlink TTI. A base station may utilize dynamic grants to schedule resources within a system. A UE may receive a grant in a first portion of a variable TTI. The UE may determine a duration of the variable TTI based on the grant, and the UE may communicate accordingly. The UE may receive a subsequent grant in the variable TTI—either in the first portion or another portion—and may respond or alter its operation accordingly.

30 Claims, 17 Drawing Sheets

(51) Int. Cl.
*H04L 5/00* (2006.01)
*H04L 5/14* (2006.01)
(52) U.S. Cl.
CPC ....... *H04L 5/0092* (2013.01); *H04W 72/0446* (2013.01); *H04L 5/001* (2013.01); *H04L 5/0023* (2013.01); *H04L 5/0064* (2013.01); *H04L 5/1469* (2013.01)

(56) References Cited

U.S. PATENT DOCUMENTS

| | | | |
|---|---|---|---|
| 2010/0074211 A1* | 3/2010 | Kim | H04L 1/1671 370/329 |
| 2014/0071954 A1 | 3/2014 | Au et al. | |
| 2015/0215082 A1* | 7/2015 | Agiwal | H04L 1/1822 370/336 |

FOREIGN PATENT DOCUMENTS

| | | |
|---|---|---|
| WO | WO-07025160 | 3/2007 |
| WO | WO-2009104922 A2 | 8/2009 |

* cited by examiner

VARIABLE LENGTH TRANSMISSION TIME INTERVALS (TTI)

CROSS REFERENCES

The present application for patent claims priority to U.S. Provisional Patent Application No. 62/069,942 by Damnjanovic et al., entitled "Variable Length Transmission Time Intervals (TTI)," filed Oct. 29, 2014, assigned to the assignee hereof, and expressly incorporated by reference herein.

BACKGROUND

1. Field of Disclosure

The following relates generally to wireless communication, and more specifically to variable length transmission time intervals (TTI).

2. Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station).

Increasingly, many wireless applications benefit from reduced latency communication. Additionally, wide bandwidth carriers and spectrum sharing (e.g., unlicensed spectrum use) may allow systems to employ reduced latency operations and flexibly and dynamically adapt to UE traffic needs with a system.

SUMMARY

Methods, systems, and apparatuses for enabling and utilizing variable length TTI are described. Latency for various UEs may be reduced by flexibly and dynamically adapting to data traffic needs. TTI for a given UE may be dynamically adjusted according to UE or system requirements, and the configuration of uplink and downlink TTI, and the duration of each TTI, may be unknown to the UE until it receives a resource grant. For instance, a UE may receive a downlink grant in a first portion of a variable TTI. The first portion of the variable TTI (e.g., the first symbol) may include a control region and a data region. The UE may determine a duration of the variable TTI based on the downlink grant, and the UE may receive data on resources of the data region of the first portion, or subsequent portions of the variable TTI based on the downlink grant. The UE may receive a subsequent grant (e.g., an uplink grant) in the variable TTI—either in the first portion or another portion—and may, for example, transmit in a subsequent TTI based on the subsequent grant.

A method of wireless communication at a UE is described. The method may include receiving a first grant in a first portion of a variable TTI, where the first portion of the variable TTI includes a control region and a data region and the data region is scheduled by the control region. The method may also include determining a duration of the variable TTI based at least in part on the received first grant.

An apparatus for wireless communication at a UE is described. The apparatus may include means for receiving a first grant in a first portion of a variable TTI, where the first portion of the variable TTI includes a control region and a data region, and the data region is scheduled by the control region. The apparatus may also include means for determining a duration of the variable TTI based at least in part on the received first grant.

A further apparatus for wireless communication at a UE is also described. The apparatus may include a processor, memory in electronic communication with the processor, and instructions stored in the memory. The instructions may be executable by the processor to receive a first grant in a first portion of a variable TTI, where the first portion of the variable TTI includes a control region and a data region, and the data region is scheduled by the control region. The instructions may also be executable by the processor to determine a duration of the variable TTI based at least in part on the received first grant.

A non-transitory computer-readable medium storing code for wireless communication at a UE is also described. The code may include instructions executable to receive a first grant in a first portion of a variable TTI, where the first portion of the variable TTI includes a control region and a data region, and the data region is scheduled by the control region, and determine a duration of the variable TTI based at least in part on the received first grant.

Some examples of the method, apparatuses, or non-transitory computer-readable medium described above may further include features, means, or instructions for receiving data on resources of the data region of the first portion of the TTI based on the received first grant, where the first grant comprises a downlink grant. Additionally or alternatively, some examples may include features, means, or instructions for transmitting on resources of a subsequent TTI that follows the variable TTI, where the transmitting is based on the received first grant, and the first grant comprises an uplink grant.

Some examples of the method, apparatuses, or non-transitory computer-readable medium described above may further include features, means, or instructions for identifying a switching interval that follows the variable TTI and precedes the subsequent TTI based on the received first grant. Additionally or alternatively, some examples may include features, means, or instructions for receiving a second grant in the control region of the first portion of the TTI, receiving data on resources of the data region of the first portion of the TTI based on the received first grant, transmitting on resources of a subsequent TTI based on the received second grant, where the first grant includes a downlink grant and the second grant includes an uplink grant.

Some examples of the method, apparatuses, or non-transitory computer-readable medium described above may further include features, means, or instructions for receiving a common control signal during the variable TTI, and identifying an inactive time interval based on the received common control signal. Additionally or alternatively, some examples may include features, means, or instructions for initiating a sleep cycle upon identifying the inactive time interval.

In some examples of the method, apparatuses, or non-transitory computer-readable medium described above, the first portion of the variable TTI is one symbol period. Additionally or alternatively, in some examples the variable TTI includes a set of symbol periods.

Some examples of the method, apparatuses, or non-transitory computer-readable medium described above may further include features, means, or instructions for receiving a second grant in a second portion of the variable TTI, redetermining the duration of the variable TTI based on the received second grant, and communicating on resources in the second portion of the variable TTI or a subsequent TTI based on the received second grant. Additionally or alternatively, in some examples, the variable TTI includes a set of symbol periods, and where the first and second portions of the variable TTI each include one symbol period of the set of symbol periods.

In some examples of the method, apparatuses, or non-transitory computer-readable medium described above, the first grant includes one of a set of downlink or uplink grants. Additionally or alternatively, some examples may include features, means, or instructions for determining a hybrid automatic repeat request (HARQ) timing based on the duration of the variable TTI.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques are described for employing variable length transmission time intervals (TTI), which may support low latency operations. A user equipment (UE) may receive grants indicative of TTI type (e.g., uplink or downlink) and duration. TTI type and length—e.g., a number of symbol periods within a TTI—may be flexibly and dynamically adjusted according to traffic needs of various UEs within a system. Accordingly, a UE may receive a grant (e.g., a downlink grant) in a first portion of a TTI (e.g., the first symbol); and the UE may determine the configuration of the TTI, including the duration (e.g., length) based on the received grant. The UE may thus operate—e.g., receive data, transmit data, sleep, etc.—based on the received grant. In some cases, a received grant may preempt earlier grants, so a UE may redetermine a duration of variable TTI based on the received grant.

The flexibility of variable TTI may allow the system to adapt to traffic needs of various UEs within the system. Additionally, and as described below, dynamically adjusting TTI duration may provide for low latency operation by granting resources to UEs with such low latency requirements.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
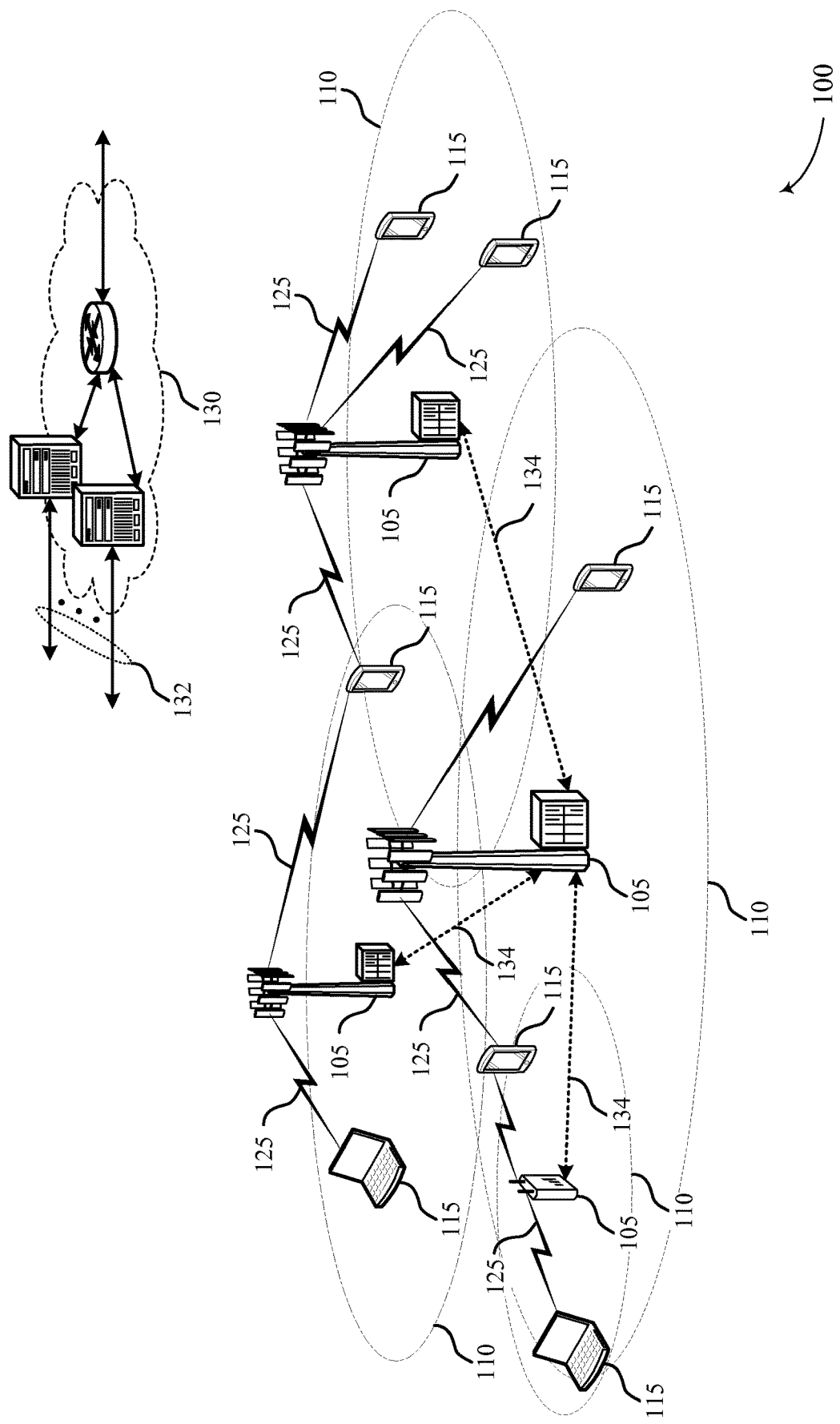
FIG. 1 illustrates an example of a wireless communications system in accordance with various aspects of the present disclosure.

FIG. 1 illustrates an example of a wireless communications system 100 in accordance with various aspects of the present disclosure. The system 100 includes base stations 105, UEs 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies.

In some examples, at least a portion of the wireless communications system 100 may be configured to operate using variable length (i.e., variable) TTI, in which downlink and uplink TTI may be dynamically adjusted to provide flexibility to dynamically adapt to particular traffic needs at a particular moment. As described below, both uplink and downlink grants may be transmitted from a base station 105 to a UE 115 in a common symbol, which may decrease latency, as required for particular UEs 115.

In some examples, the wireless communications system 100 is a Long Term Evolution (LTE)/LTE-Advanced (LTE-A) network. In LTE/LTE-A networks, the term evolved node B (eNB) may be generally used to describe the base stations 105. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures for FDD (e.g., frame structure type 1) and TDD (e.g., frame structure type 2) may be defined.

In some examples of the system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

The term "component carrier" may refer to each of the multiple carriers utilized by a UE in carrier aggregation (CA) operation, and may be distinct from other portions of system bandwidth. For instance, a component carrier may be a relatively narrow-bandwidth carrier susceptible of being utilized independently or in combination with other component carriers. Each component carrier may provide the same capabilities as an isolated carrier based on release 8 or release 9 of the LTE standard. Multiple component carriers may be aggregated or utilized concurrently to provide some UEs 115 with greater bandwidth and, e.g., higher data rates. Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode.

A carrier used for DL may be referred to as a DL CC, and a carrier used for UL may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc. A UE 115 may communicate with a single base station 105 utilizing multiple carriers, and may also communicate with multiple base stations simultaneously on different carriers. Each cell of a base station 105 may include an UL component carrier (CC) and a DL CC. The geographic coverage area 110 of each serving cell for a base station 105 may be different (e.g., CCs on different frequency bands may experience different path loss).

In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information (UCI), and scheduling information transmitted on physical uplink control channel (PUCCH), are carried by the primary cell. Additional carriers may be designated as secondary carriers, or secondary component carriers (SCC), which may be served by secondary cells (SCells). Secondary cells may likewise be semi-statically configured on a per-UE basis. In some cases, secondary cells may not include or be configured to transmit the same control information as the primary cell. In some examples, and as described below, an enhanced component carrier (eCC) may be configured—e.g., as an SCell. An eCC may utilize variable TTI, which may be dynamically adjusted according to traffic conditions.

In some cases, a UE 115 may be served by cells from two or more base stations 105 that are connected by a non-ideal backhaul 134 in dual connectivity operation. For example, the connection between the serving base stations 105 may not be sufficient to facilitate precise timing coordination. Thus, in some cases, the cells serving a UE 115 may be divided into multiple timing adjustment group (TAGs). Each TAG may be associated with a different timing offset, such that the UE 115 may synchronize UL transmissions differently for different UL carriers.

In some examples, one cell may utilize licensed spectrum, while another cell may utilize unlicensed spectrum. An eCC may be configured for unlicensed spectrum, for instance. Broadly speaking, the unlicensed spectrum in some jurisdictions may range from 600 Megahertz (MHz) to 6 Gigahertz (GHz). As used herein, the term "unlicensed spectrum" or "shared spectrum" may thus refer to industrial, scientific and medical (ISM) radio bands, irrespective of the frequency of those bands. In some examples, unlicensed spectrum is the U-NII radio band, which may also be referred to as the 5 GHz or 5G band. By contrast, the term "licensed spectrum" or "cellular spectrum" may be used herein to refer to wireless spectrum utilized by wireless network operators under administrative license from a governing agency.

Figure 2:
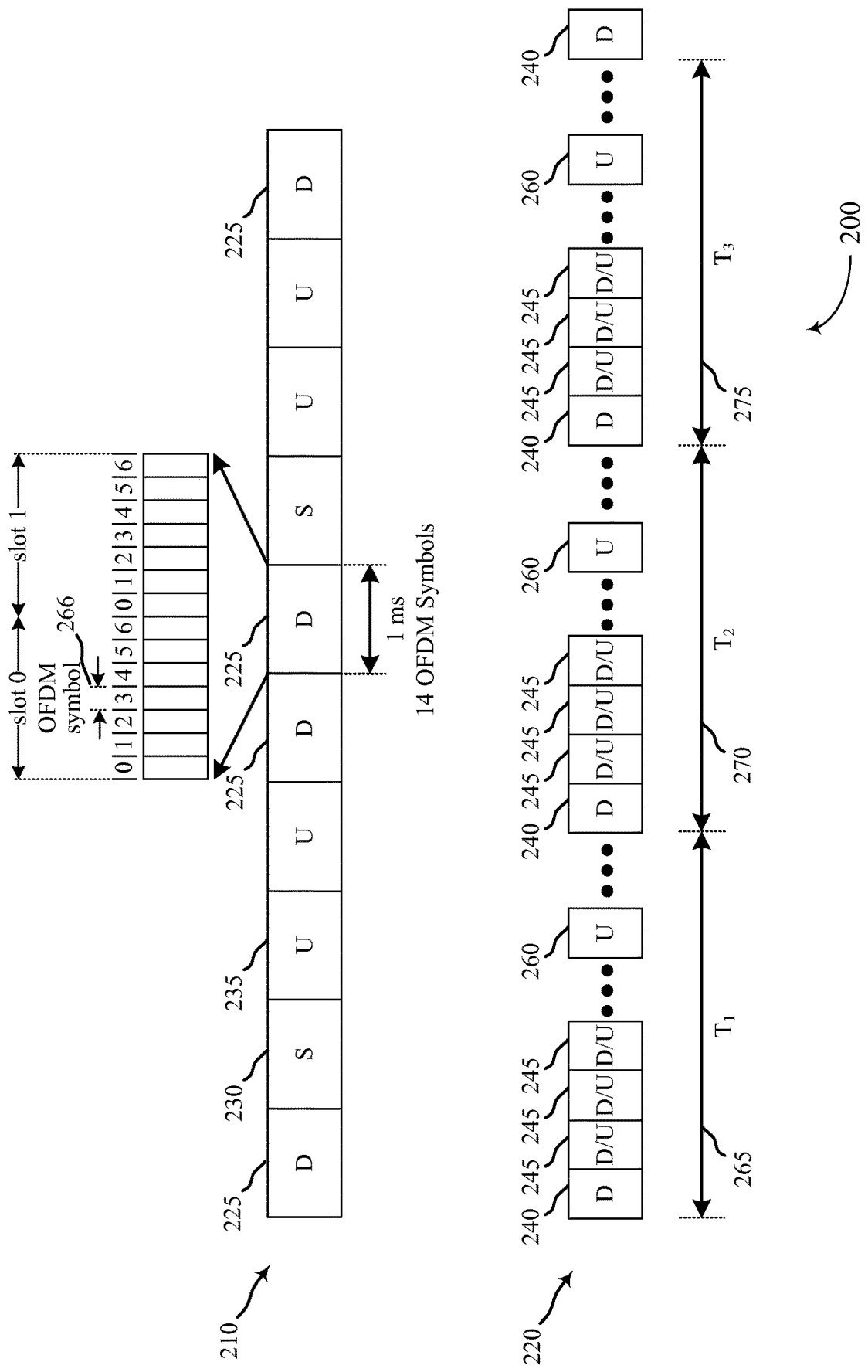
FIG. 2 illustrates an example of radio frames and different subframes that may be transmitted using different cells of a wireless communication system in accordance with aspects of the present disclosure.

As discussed above, various examples provide communications in a wireless communications system, such as wireless communications system 100 of FIG. 1, that utilize variable TTI. FIG. 2 is a block diagram 200 conceptually illustrating an example of radio frames and different subframes that may be transmitted using different cells of a wireless communication system, such as wireless communications system 100 of FIG. 1, in accordance with aspects of the present disclosure. The radio frames of FIG. 2 may be transmitted using portions of the wireless communications system 100 described with reference to FIG. 1 between one or more base stations 105 and one or more UEs 115, for example. In this example, a legacy PCell transmission 210 may include a TDD frame that include ten 1 ms subframes, including downlink subframes 225, special subframes 230, and uplink subframes 235. The downlink subframes 225, special subframes 230, and uplink subframes 235 may include a subframe structure defined according to established LTE standards, which may include 14 symbols 266 within each 1 ms subframe. In some examples, downlink subframes 225 may include downlink orthogonal frequency division multiplexing (OFDM) symbols, uplink subframes may include single carrier frequency division multiplexing (SC-FDM) symbols, and special subframes 230 may include both uplink SC-FDM symbols and downlink OFDM symbols.

In the example of FIG. 2, SCell transmissions 220 may include or burst mode transmissions that may replace the legacy frame structure with a TDD-based frame structure that allows for dynamic switching between downlink and uplink symbols and for variable TTI lengths. While the example of FIG. 2 shows the low latency or burst mode transmissions on a SCell, it will be understood that such transmission structures, as well as various of the techniques and principles described herein, may be implemented in other transmissions, such as within one or more burst mode subframes of a legacy LTE frame, in other PCell transmissions, in licensed or unlicensed spectrum or the like. In the example of FIG. 2, the SCell may be an eCC, and the SCell transmissions 220, which may be referred to as eCC transmissions, may include designated downlink symbols 240 and designated uplink symbols 260, and flexible symbols 245 that may be allocated as uplink or downlink symbols based on particular traffic needs.

The designated downlink symbols 240 and designated uplink symbols 260 may be provided to enable various radio resource management (RRM) measurements, synchronization, CSI feedback, random access channel (RACH) and scheduling request (SR) communications, for example. The designated downlink symbols 240 and designated uplink symbols 260 may be configured by a base station, such as base stations 105 of FIG. 1, and may be communicated to one or more UEs, such as UEs 115 of FIG. 1, via RRC signaling, a system information block (SIB), or physical downlink control channel (PDCCH) signaling. As mentioned, flexible symbols 245 may be switched to be uplink or downlink symbols, and the indication of such configurations may be provided by a base station in an allocation of uplink or downlink resources that is provided to a UE 115. Based on such an allocation, the UE may determine that a certain number of symbols 240, 245, 260 may be allocated for communications between the UE and the base station.

With such dynamic switching of symbols, a base station and UE are not required to look ahead in terms of a number of uplink or downlink subframes for an entire radio frame, but may determine particular resource allocations in a dynamic and flexible manner. The number of resources allocated for a particular UE may be determined, for example, on an amount of data to be transmitted between the UE and the base station, and a latency requirement or quality of service (QoS) requirement associated with the data. In some examples, each of the symbols 240, 245, and 260 may have a reduced symbol duration relative to the legacy OFDM or SC-FDM symbols (e.g., symbols 266), and in some examples have a symbol duration of 11.36 μs per symbol, including a useful symbol duration of 8.33 μs and a cyclic prefix duration of 2.03 μs. Symbols 240, 245, and 260 may have increased tone spacing for subcarriers relative to legacy symbols, and in some examples have a tone spacing of 120 kHz, and utilize a relatively wide bandwidth (e.g., 80 MHz).

Such shortened symbol duration and dynamic switching between downlink and uplink communications may allow for reduced ACK/NACK turn-around time, and may thus provide relatively low latency transmissions of data. In some examples, delay sensitive data may be transmitted using SCell transmissions 220, while other data that is not as delay sensitive may be transmitted using PCell transmissions 210.

In some examples, a number of symbols 240, 245, and 260 may be allocated to a first UE for a first time period ($T_1$) 265, and may be allocated to the first UE or one or more other UEs during a second time period ($T_2$) 270 and third time period ($T_3$) 275. The length of such time periods 265, 270, 275 may be determined according to a variety of factors including, for example, an amount of data to be transmitted, a QoS associated with the data, a delay requirement of the data, a number of other UEs present, or channel conditions, to name but a few.

Figure 3:
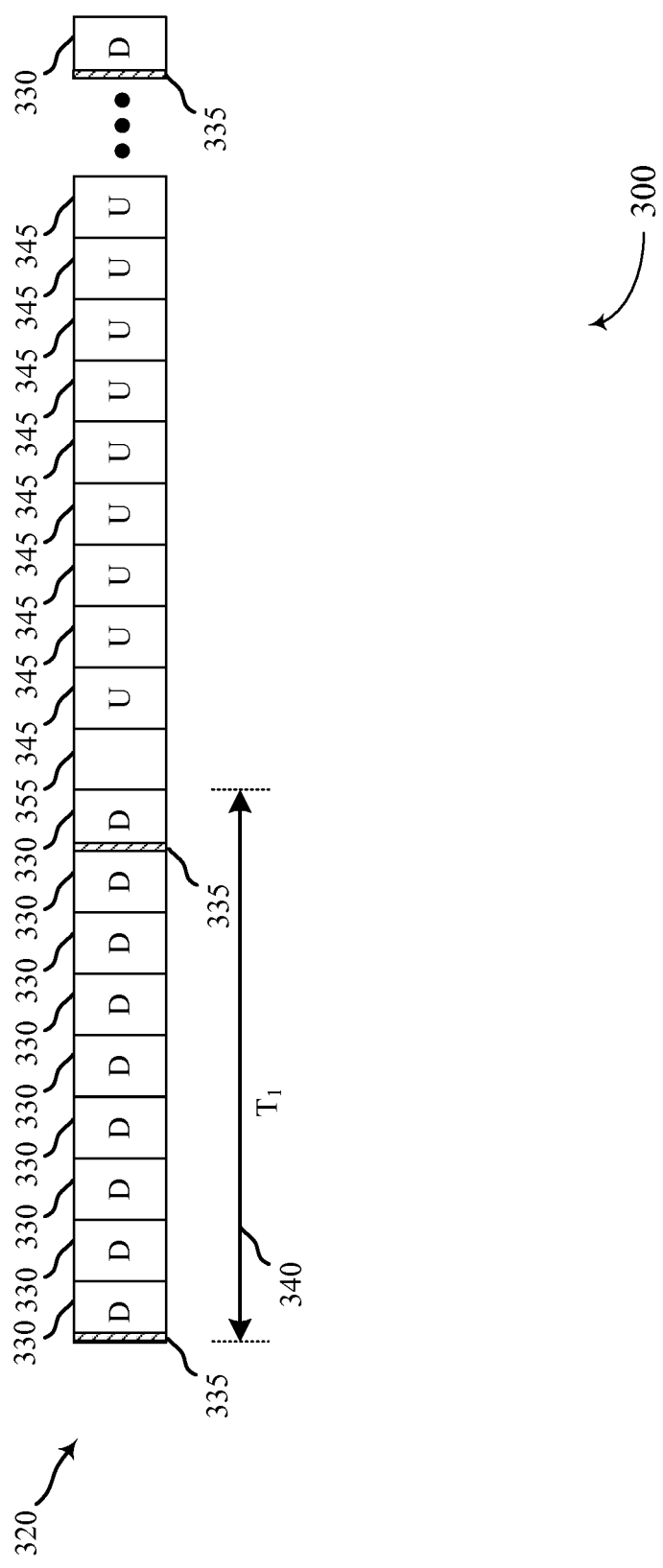
FIG. 3 illustrates an example of enhanced component carrier (eCC) transmissions in accordance with various aspects of the present disclosure.

With reference now to FIG. 3 a block diagram 300 conceptually illustrating an example of eCC transmissions is discussed. In the example of FIG. 3, eCC transmissions 320 may include a number of symbols allocated as uplink or downlink symbols. Such transmissions 320 may be transmitted using different cells of a wireless communication system, such as wireless communications system 100 of FIG. 1, in accordance with aspects of the present disclosure. In some examples, transmissions 320 are transmitted on a SCell such as discussed above with respect to FIG. 2. In the example of FIG. 3, a first time period ($T_1$) 340 may include a downlink grant of nine symbols 330. In this example, an initial downlink symbol 330 may include control information 335 that may indicate resource allocations for an upcoming time period (e.g., $T_1$ 340).

In some examples, the control information 335 may include a downlink grant of resources to a UE that include the subsequent symbols 330. In this example, a subsequent transmission of control information 335 may include an uplink grant of eight uplink symbols 345. A blank symbol 355 may be included between a downlink symbol 330 and an uplink symbol 345, to allow time for switching at a UE. The blank symbol 355 may, in some examples, be referred to as a switching symbol or a special symbol. In some examples, bundles of symbols 330, 345 may be allocated to a UE by a base station, with a length of such bundles controlled by control information (e.g., dynamic grants) 335. A relatively large number of symbols may be allocated to provide enhanced efficiency in some examples that are somewhat less delay sensitive.

Figure 4:
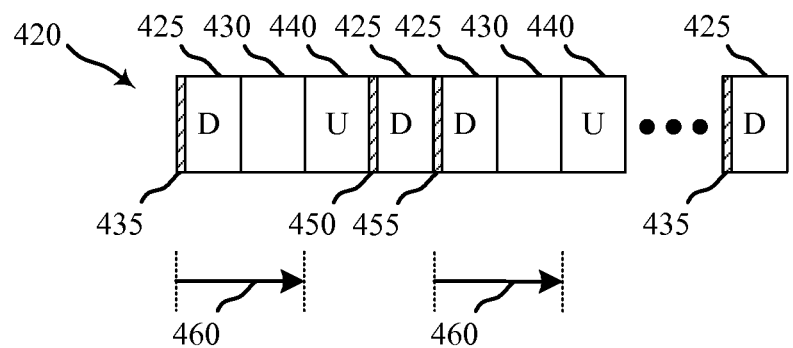
FIG. 4 illustrates an example of eCC transmissions in accordance with various aspects of the present disclosure.

In other examples, if data transmissions are relatively delay sensitive, dynamic grants to a particular UE may be relatively short in order to provide for reduced ACK/NACK turn-around times. FIG. 4 illustrates an example 400 of relatively short grants. In this example, eCC transmissions 420 may include resource allocations of only one or two symbols. The eCC transmissions 420 of FIG. 4 may be transmitted using a wireless communication system, such as wireless communications system 100 of FIG. 1, in accordance with aspects of the present disclosure. In some examples, transmissions 420 are transmitted on a SCell, such as discussed above with respect to FIGS. 2 and 3. In this example, control information 435 in the initial downlink symbol 425 may include a downlink grant of one symbol (e.g., TTI=1 symbol) and an uplink grant of one symbol (e.g., TTI=1 symbol). The uplink grant, in various examples, may take effect at a two symbol minimum from the receipt of the control information 435, in order to accommodate blank symbol 430 and allow for switching at the UE to transmit uplink symbol 440. In this example, eCC transmissions 420 include a transmission of second control information 450 which, in this example, is a downlink grant for two symbols (e.g., TTI=2 symbols), with third control information 455 providing a subsequent uplink grant which may have a TTI of one or more uplink symbols 440. The time periods or TTI 460 are 2 symbols.

Figure 5:
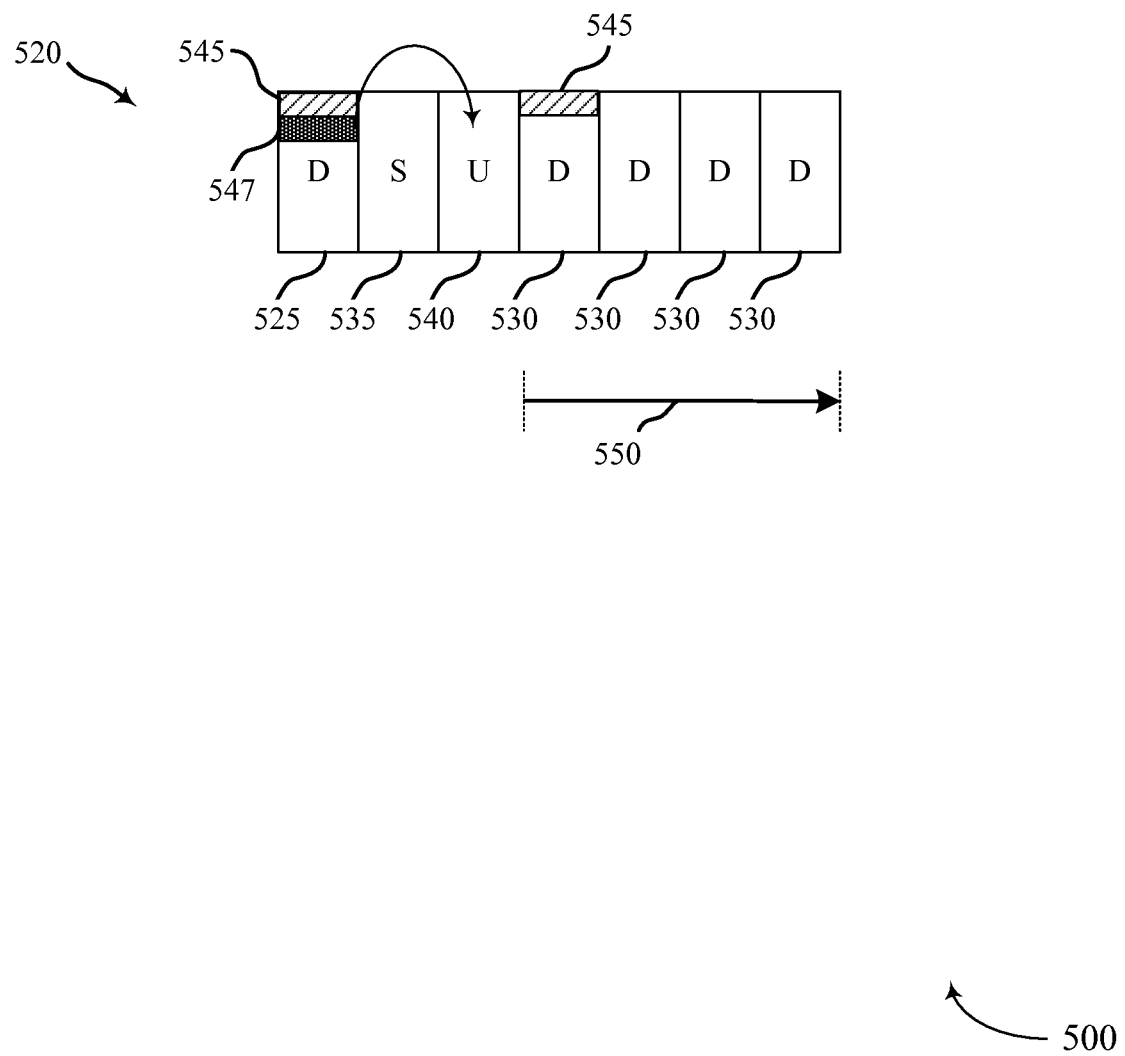
FIG. 5 illustrates an example of a carrier employing variable length TTI in accordance with various aspects of the present disclosure.

Next, FIG. 5 illustrates an example 500 of a transmission 520 employing variable length TTI in accordance with various aspects of the present disclosure. The transmission 520 may be transmitted on an SCell and may be an example of an eCC described with reference to the FIGS. 2-4. The transmission 520 may be utilized in a wireless communication system, such as the system described with reference to FIG. 1. The transmission 520, which may represent a carrier, may thus provide for communications between base stations 105 (FIG. 1) and UEs 115 (FIG. 1).

In the example of FIG. 5, the symbols, including the first downlink symbol 525, may include a control region and a data region; and dynamic grants in the control region may be utilized to schedule resources and convey to UEs variable TTI durations. The downlink symbol 525 may be the first symbol in a multi-symbol TTI, which may be a variable TTI. The downlink symbol 525 may thus be referred to as a first portion of a variable TTI. In some configurations, the transmission 520 may include blank or switching symbols 535, uplink symbols 540, or subsequent downlink symbols 530. Some examples of transmissions 520 include all three types of symbols: uplink, downlink, and switching.

The control region of the downlink symbol 525 may include a downlink grant 545 or an uplink grant 547, or both. The downlink grant 545 may assign resources—e.g., in the data region—of downlink symbol 525. For example, a downlink grant 545 may indicate a grant for symbol n, where n is the symbol in which the grant is received. In some cases, a UE 115 thus receives (e.g., blindly decodes) the downlink grant 545, and then receives downlink data in the downlink symbol 525. Similarly, the uplink grant 547 may assign uplink resources in a subsequent TTI. An uplink grant 547 may, for example, indicate a grant for symbol n+2, where n is the symbol in which the grant is received. As depicted in FIG. 5, the uplink grant 547 may assign uplink resources two symbols after the symbol period in which it was received. In other words, as depicted in FIG. 5, an uplink grant 547 may take effect in two (2) symbols. An uplink grant 547 may, however, assign resources of a variable TTI, which may be any period following the symbol in which it is received. Likewise, a downlink grant 545 may assign resources for multiple downlink symbols 530. The TTI 550, as depicted, is four (4) symbol periods in duration—i.e., the TTI 550 has a four (4) symbol length. In some cases, a UE 115 may determine a hybrid automatic repeat request (HARM) timing based on the duration of the variable TTI, and may transmit feedback for each symbol of a TTI in an uplink symbol following a downlink TTI.

As mentioned, a control region of a symbol may include multiple downlink and uplink grants. Thus, a control region may grant resources within the same or different symbols to one or several UEs 115. For example, in an 80 MHz band carrier, such as an eCC utilizing unlicensed spectrum, more than one UE 115 may be granted downlink or uplink resources within a common symbol.

Additionally or alternatively, in some cases, a blank or switching symbol 535 is included with transmission 520 to allow a UE 115 to transition from a receive mode to a transmit mode. That is, the switching symbol 535 may provide time for a UE 115 to prepare and transmit control or data, or both, including, for instance, feedback information for data schedule during the downlink symbol 525. A downlink-to-uplink switching notification may be transmitted by a base station 105 (FIG. 1), and the notification may be different for different UEs 115. For instance, an uplink grant 547 may notify a scheduled UE 115 of a switching symbol 535; but other UEs 115 may be notified in a common control signal. The common control signal may also be conveyed in the control region of a symbol, such as downlink symbol 525. The common control signal may indicate to UEs 115 the timing an duration of an uplink symbol period or uplink TTI (e.g., uplink symbol 540). That is, the common control signal may indicate to some UEs 115 the length of an uplink assignment to another UE 115. This indication may allow UEs 115 that are not scheduled to avoid blind detection of control information in a particular uplink TTI, and the unscheduled UEs 115 may avoid preparing (e.g., configuring themselves) for uplink transmissions. In some cases, these unscheduled UEs 115 may also be able to enter a power saving mode, or "sleep" mode, during an uplink TTI scheduled for another UE 115.

Figure 6:
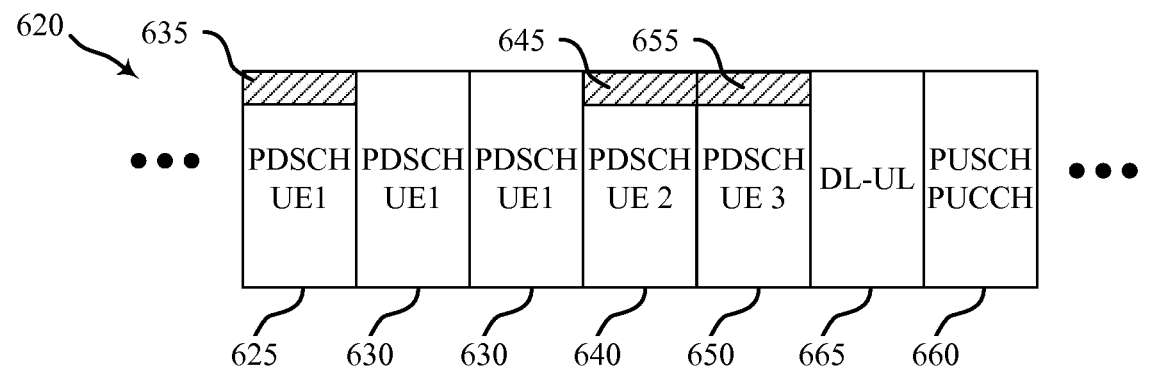
FIG. 6 illustrates an example of a variable length TTI in which control signaling in a symbol indicates transmission preemption of the variable length TTI in accordance with an aspect of the present disclosure.

In some examples, a resource grant to a particular UE may be preempted in the event that delay sensitive data is received for transmission to a second UE. With reference now to FIG. 6, an example 600 of a resource grant and subsequent preemption of the resource grant within transmissions 620 is discussed. The transmissions 620 of FIG. 6 may be transmitted using a wireless communication system, such as wireless communications system 100 of FIG. 1, in accordance with aspects of the present disclosure. In some examples, transmissions 520 are transmitted on a SCell, which may be an eCC, such as discussed above with respect to FIGS. 2-5.

In the example of FIG. 6, an initial or first downlink symbol 625 may include control information 635, which, in turn, may include a downlink grant to a first UE (UE1) for some number of downlink symbols. For example, the control information 635 may include a downlink grant for 9 downlink symbols, and an uplink grant for 8 symbols, in fashion similar to that discussed above with respect to FIG. 3. In this example, two downlink symbols 630, and the initial downlink symbol 625 are transmitted to the first UE. Subsequent to the downlink grant, delay sensitive data may be received for a second UE (UE2). In the example of FIG. 5, a base station may transmit control information 645 in the fourth downlink symbol 640. The control information may indicate to the first UE that the existing downlink grant has been preempted. The first UE, upon receiving the control information, may cancel the remaining portion of the downlink grant. The base station may transmit downlink data to the second UE in downlink symbol 640. In some examples, the control information 645 may include a downlink grant to the second UE.

In this example, downlink data for a third UE (UE3) may also be received, and the base station may transmit control information 655 that indicates that the next downlink symbol 650 is allocated for downlink data to the third UE. The control information 655 may also provide an uplink grant for an uplink symbol 660, as well as an indication of a switching symbol 665. Transmitting such control information 645, 655, enables the base station to quickly schedule delay sensitive traffic, even during the on-going downlink transmission of the longer length TTI initially allocated in the downlink grant (or control information) included in downlink symbol 625. Without such preemption, a base station may need to wait until an existing scheduled grant is completed before transmitting delay sensitive data. In some examples, the existence of the control information 645, 655 during the multi-symbol downlink scheduled TTI alerts the scheduled UE (e.g., first UE) about the preemption of the previously given grant, and the first UE may cancel the previously given multi-symbol assignment. Furthermore, in some examples, an uplink grant may be sent in the same control information 645, 655, that is used to preempt a grant to a UE.

Figure 7:
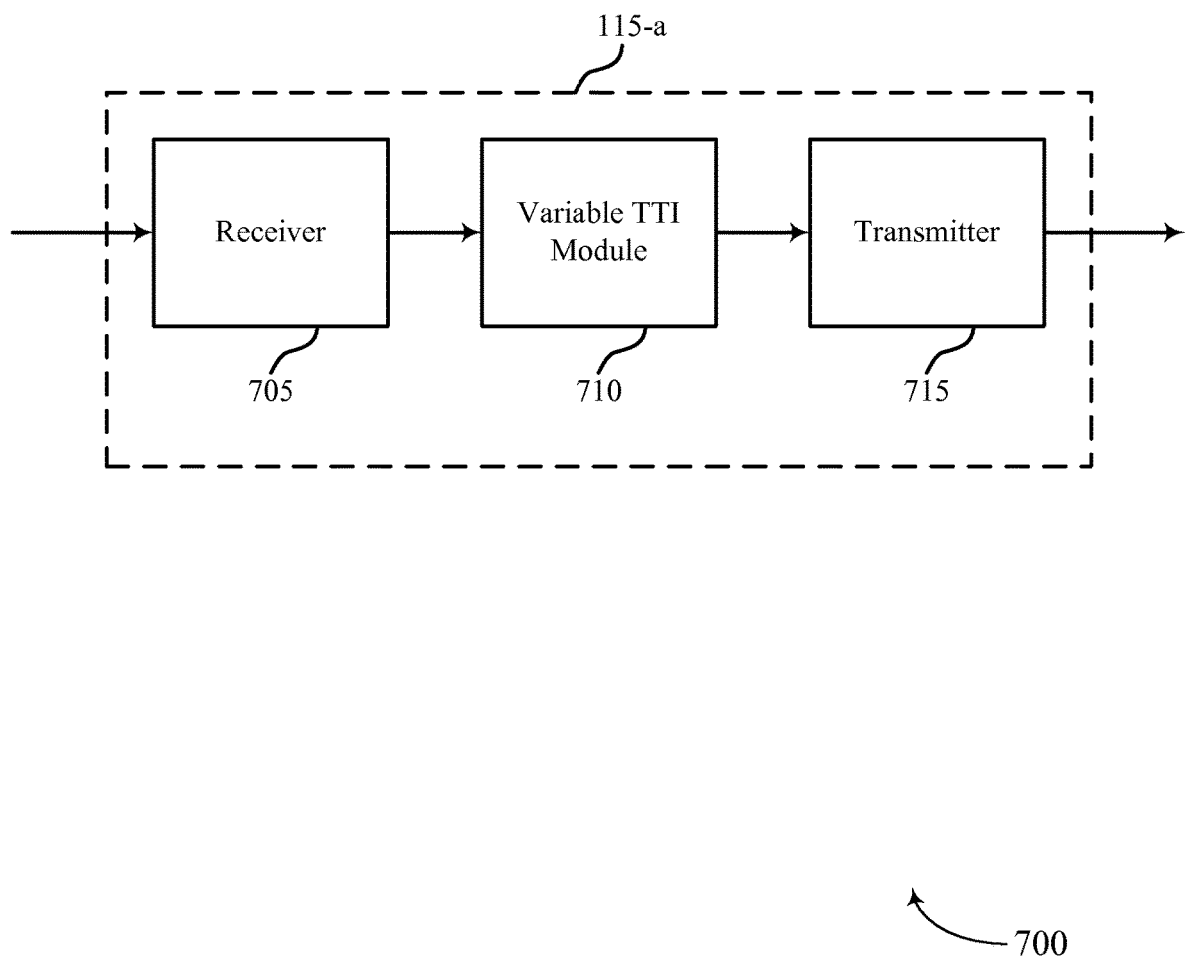
FIG. 7 shows a block diagram of a user equipment (UE) configured for variable length TTI in accordance with various aspects of the present disclosure.

FIG. 7 shows a block diagram 700 of a UE 115-*a* configured for variable length TTI in accordance with various aspects of the present disclosure. UE 115-*a* may be an example of aspects of a UE 115 described with reference to FIG. 1, and it may be configured to communicate utilizing transmissions as described with reference to FIGS. 2-6. UE 115-*a* may include a receiver 705, a variable TTI module 710, or a transmitter 715. UE 115-*a* may also include a processor. Each of these components may be in communication with one another.

The receiver 705 may receive information such as packets, user data, or control information associated with various information channels (e.g., control channels, data channels, and information related to variable length TTI, etc.). Receiver 705 may also represent an example of aspects of transceiver 1035 with respect to FIG. 10. Information may be passed on to the variable TTI module 710, and to other components of UE 115-*a*. Variable TTI module 710 may also represent an example of aspects of variable TTI module 1010 with respect to FIG. 10.

The variable TTI module 710 may, in combination with the receiver 705 and as described with reference to FIG. 5, receive a first grant in a first portion of a variable TTI, where the first portion of the variable TTI includes a control region and a data region, the data region scheduled by the control region. The variable TTI module 710 may also determine a duration of the variable TTI based on the received first grant.

The transmitter 715 may transmit signals received from other components of UE 115-*a*. In some examples, the transmitter 715 may be collocated with the receiver 705 in a transceiver module. The transmitter 715 may include a single antenna, or it may include a set of antennas. Transmitter 715 may also represent an example of aspects of transceiver 1035 with respect to FIG. 10.

Figure 8:
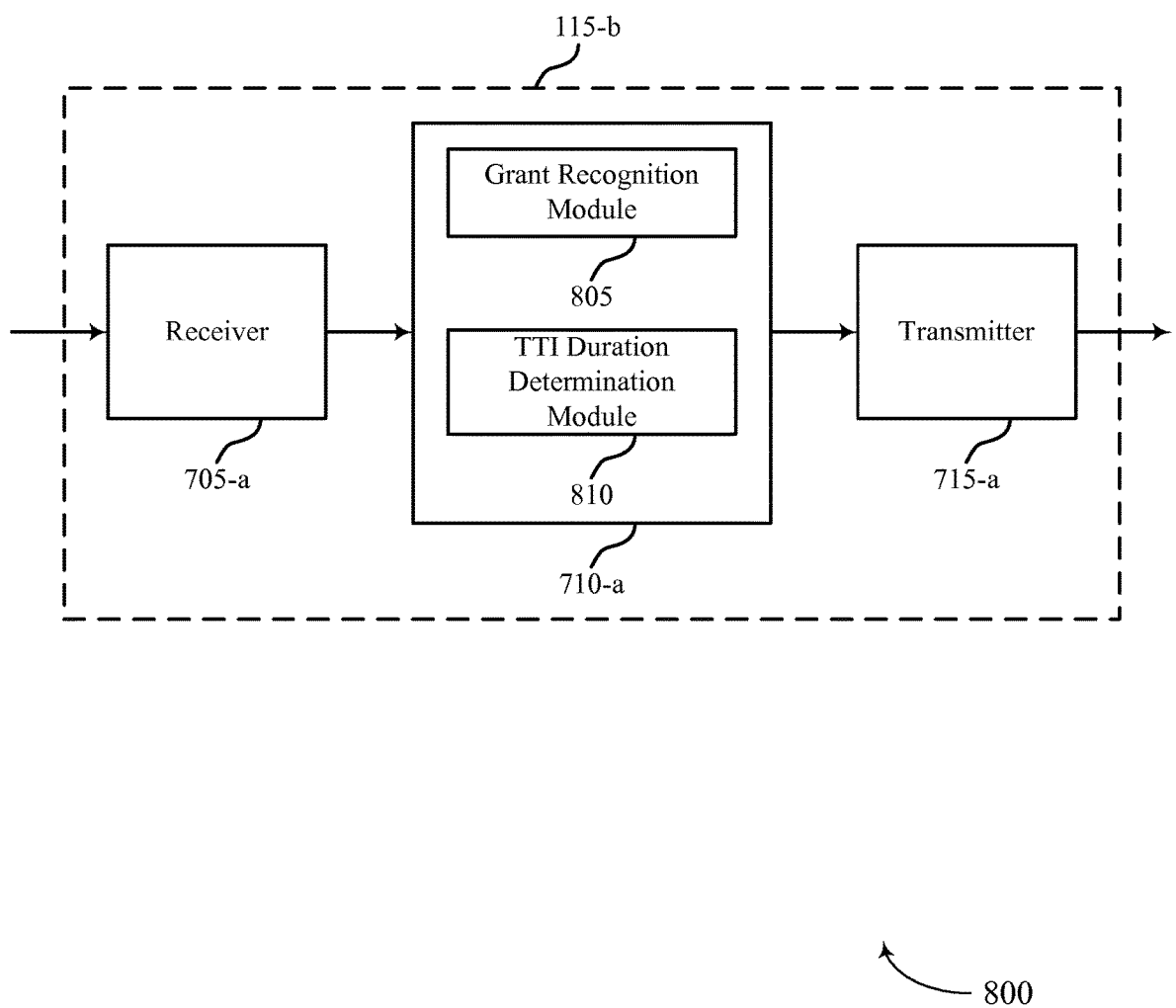
FIG. 8 shows a block diagram of a UE configured for variable length TTI in accordance with various aspects of the present disclosure.

FIG. 8 shows a block diagram 800 of a UE 115-*b* for variable length TTI in accordance with various aspects of the present disclosure. UE 115-*b* may be an example of aspects of a UE 115 described with reference to FIGS. 1 and 7, and it may be configured to communicate utilizing transmissions as described with reference to FIGS. 2-6. UE 115-*b* may include a receiver 705-*a*, a variable TTI module 710-*a*, or a transmitter 715-*a*. Receiver 705-*a* and transmitter 715-*a* may also represent examples of aspects of transceiver 1035 with respect to FIG. 10. Variable TTI module 710-*a* may also represent an example of aspects of variable TTI module 1010 with respect to FIG. 10. UE 115-*b* may also include a processor. Each of these components may be in communication with one another. In some examples, the variable TTI module 710-*a* also includes a grant recognition module 805, and a TTI duration determination module 810.

The receiver 705-*a* may receive information which may be passed on to variable TTI module 710-*a*, and to other components of UE 115-*b*. The variable TTI module 710-*a* may perform the operations described above with reference to FIG. 7. The transmitter 715-*a* may transmit signals received from other components of UE 115-*b*.

The grant recognition module 805 may, in combination with the receiver 705-*a*, receive a first grant in a first portion of a variable TTI, where the first portion of the variable TTI includes a control region and a data region, and where the data region may be scheduled by the control region, as described above with reference to FIG. 5. In some examples, the first grant includes a downlink grant and the second grant includes an uplink grant. The grant recognition module 805 may also receive a second grant in a second portion of the variable TTI. In some examples, the first grant includes one of a set of downlink or uplink grants. Grant recognition module 805 may also represent an example of aspects of variable TTI module 1010 with respect to FIG. 10.

The TTI duration determination module 810 may determine a duration of the variable TTI based on the received first grant, as described above with reference to FIGS. 2-6. In some examples, the first portion of the variable TTI includes one symbol period. In some examples, the variable TTI includes a set of symbol periods. The TTI duration determination module 810 may also redetermine the duration of the variable TTI based on the received second grant. In some examples, the variable TTI includes a set of symbol periods, and the first and second portions of the variable TTI each include one symbol period of the set of symbol periods. Grant recognition module 805 may also represent an example of aspects of variable TTI module 1010 with respect to FIG. 10.

Figure 9:
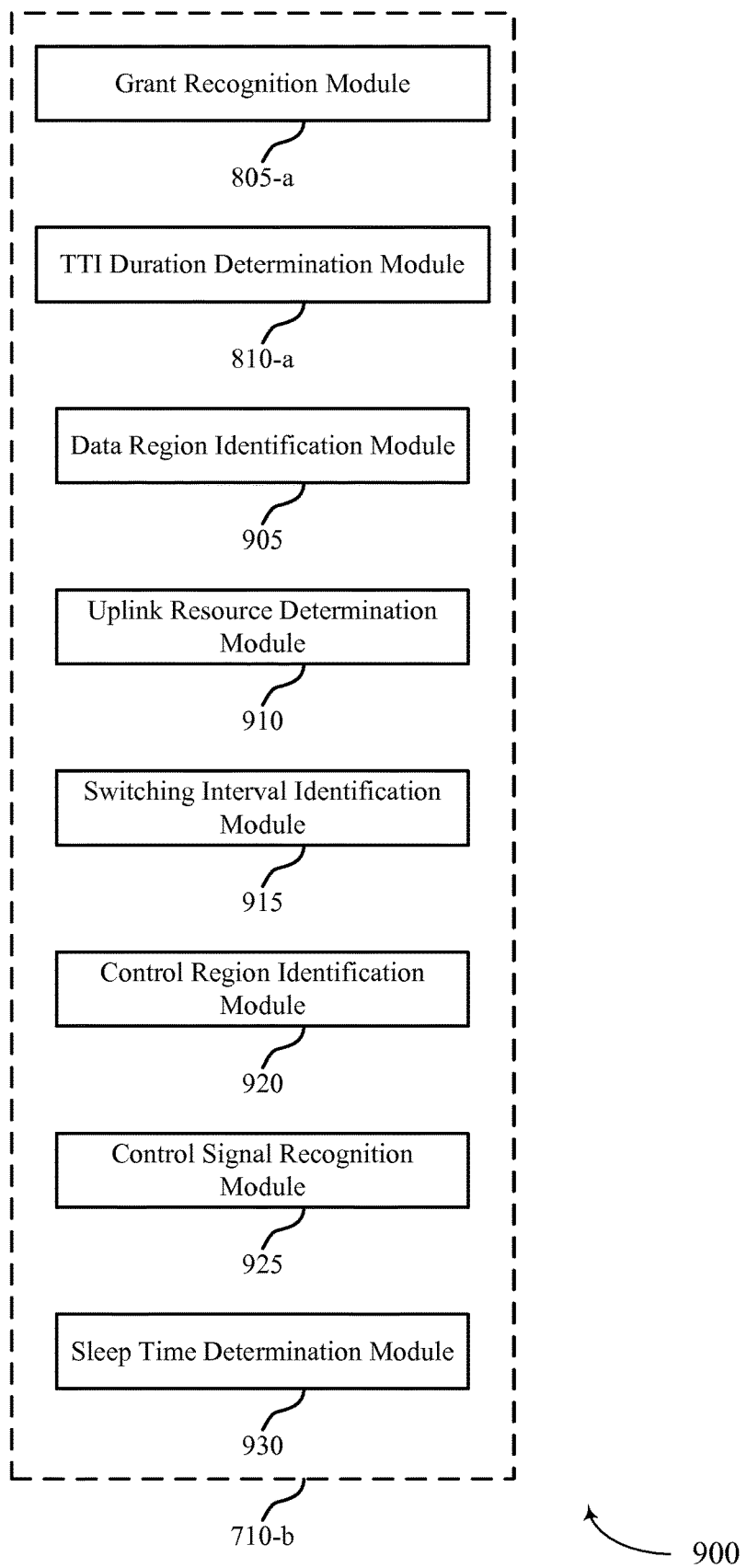
FIG. 9 shows a block diagram of module configured for variable length TTI in accordance with various aspects of the present disclosure.

FIG. 9 shows a block diagram 900 of a variable TTI module 710-*b* for variable length TTI in accordance with various aspects of the present disclosure. The variable TTI module 710-*b* may be an example of aspects of a variable TTI module 710 described with reference to FIGS. 7 and 8. The variable TTI module 710-*b* may also be an example of aspects of variable TTI module 1010 with respect to FIG. 10. The variable TTI module 710-*b* may include a grant recognition module 805-*a*, and a TTI duration determination module 810-*a*. Each of these modules may perform the functions described above with reference to FIG. 8. The variable TTI module 710-*b* may also include a data region identification module 905, an uplink resource determination module 910, a switching interval identification module 915, a control region identification module 920, a control signal recognition module 925, and a sleep time determination module 930.

The data region identification module 905 may receive data on resources of the data region of the first portion of the TTI based on the received first grant, where the first grant includes a downlink grant, as described above with reference to FIGS. 2-6. The data region identification module 905 may also receive data on resources of the data region of the first portion of the TTI based on the received first grant. Data region identification module 905 may also represent an example of aspects of variable TTI module 1010 with respect to FIG. 10.

The uplink resource determination module 910 may transmit on resources of a subsequent TTI that follows the variable TTI, where the transmitting is based on the received first grant, and the first grant includes an uplink grant, as described above with reference to FIGS. 2-6. The uplink resource determination module 910 may also transmit on resources of a subsequent TTI based on the received second grant. The uplink resource determination module 910 may, in some examples, communicate on resources in the second portion of the variable TTI or a subsequent TTI based on the received second grant. Uplink resource determination module 910 may also represent an example of aspects of variable TTI module 1010 with respect to FIG. 10.

The switching interval identification module 915 may identify a switching interval—e.g., a blank or switching symbol—that follows the variable TTI and precedes the subsequent TTI, as described above with reference to FIGS. 2-6. For instance, the identification may be based on a received grant. Additionally or alternatively, the control region identification module 920 may receive a second grant in the control region of the first portion of the TTI, while the control signal recognition module 925 may receive a common control signal during the variable TTI, as described above with reference to FIGS. 2-6. Switching interval identification module 915 may also represent an example of aspects of variable TTI module 1010 with respect to FIG. 10.

The sleep time determination module 930 may identify an inactive time interval based on the received common control signal as described above with reference to FIGS. 2-6. The sleep time determination module 930 may also initiate a sleep cycle upon identifying the inactive time interval. Sleep time determination module 930 may also represent an example of aspects of variable TTI module 1010 with respect to FIG. 10.

The components of UE 115-a, UE 115-b, or a variable TTI module 710-b may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 10:
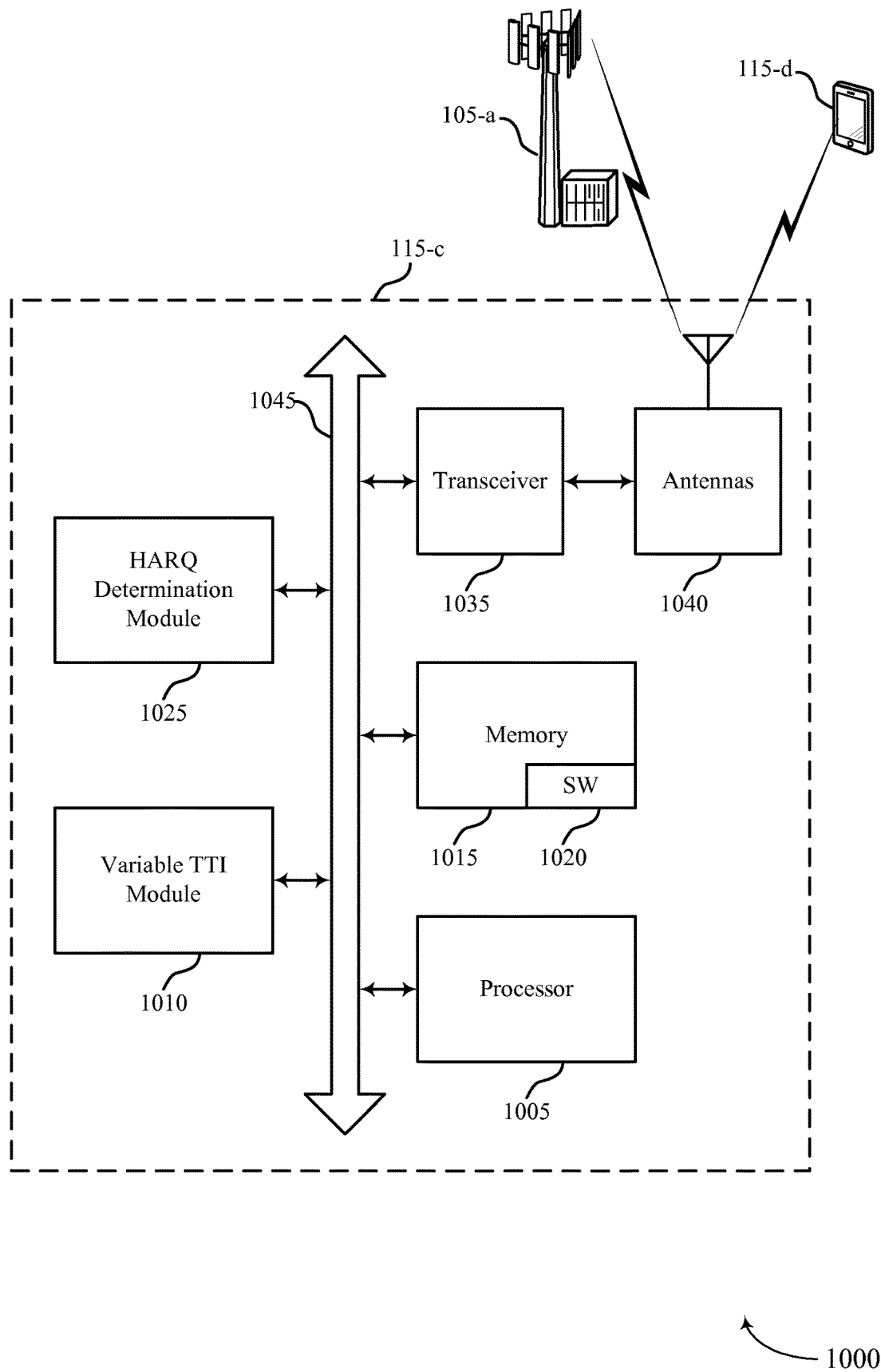
FIG. 10 illustrates a block diagram of a system including a UE configured for variable length TTI in accordance with various aspects of the present disclosure.

FIG. 10 shows a diagram of a system 1000 including a UE 115 configured for variable length TTI in accordance with various aspects of the present disclosure. System 1000 may include UE 115-c, which may be an example of a UE 115 described above with reference to FIG. 1, 7, or 8, and it may be configured to communicate utilizing transmissions as described with reference to FIGS. 2-6. UE 115-c may include a variable TTI module 1010, which may be an example of a variable TTI module 710 described with reference to FIGS. 7-9. UE 115-c may also include a HARQ determination module 1025, which may determine a hybrid automatic repeat request (HARQ) timing based on the duration of the variable TTI as described above with reference to FIGS. 2-5. UE 115-c may also include components for bi-directional voice and data communications including components for transmitting communications and components for receiving communications. For example, UE 115-c may communicate bi-directionally with UE 115-d or base station 105-a.

UE 115-c may also include a processor module 1005, and memory 1015 (including software (SW) 1020), a transceiver 1035, and one or more antenna(s) 1040, each of which may communicate, directly or indirectly, with each other (e.g., via buses 1045). The transceiver 1035 may communicate bi-directionally, via the antenna(s) 1040 or wired or wireless links, with one or more networks, as described above. For example, the transceiver 1035 may communicate bi-directionally with a base station 105 or another UE 115. The transceiver 1035 may include a modem to modulate the packets and provide the modulated packets to the antenna(s) 1040 for transmission, and to demodulate packets received from the antenna(s) 1040. While UE 115-c may include a single antenna 1040, UE 115-c may also have multiple antennas 1040 capable of concurrently transmitting or receiving multiple wireless transmissions.

The memory 1015 may include random access memory (RAM) and read only memory (ROM). The memory 1015 may store computer-readable, computer-executable software/firmware code 1020 including instructions that, when executed, cause the processor module 1005 to perform various functions described herein (e.g., variable length TTI, etc.). Alternatively, the software/firmware code 1020 may not be directly executable by the processor module 1005 but cause a computer (e.g., when compiled and executed) to perform functions described herein. The processor module 1005 may include an intelligent hardware device, (e.g., a central processing unit (CPU), a microcontroller, an ASIC, etc.)

Figure 11:
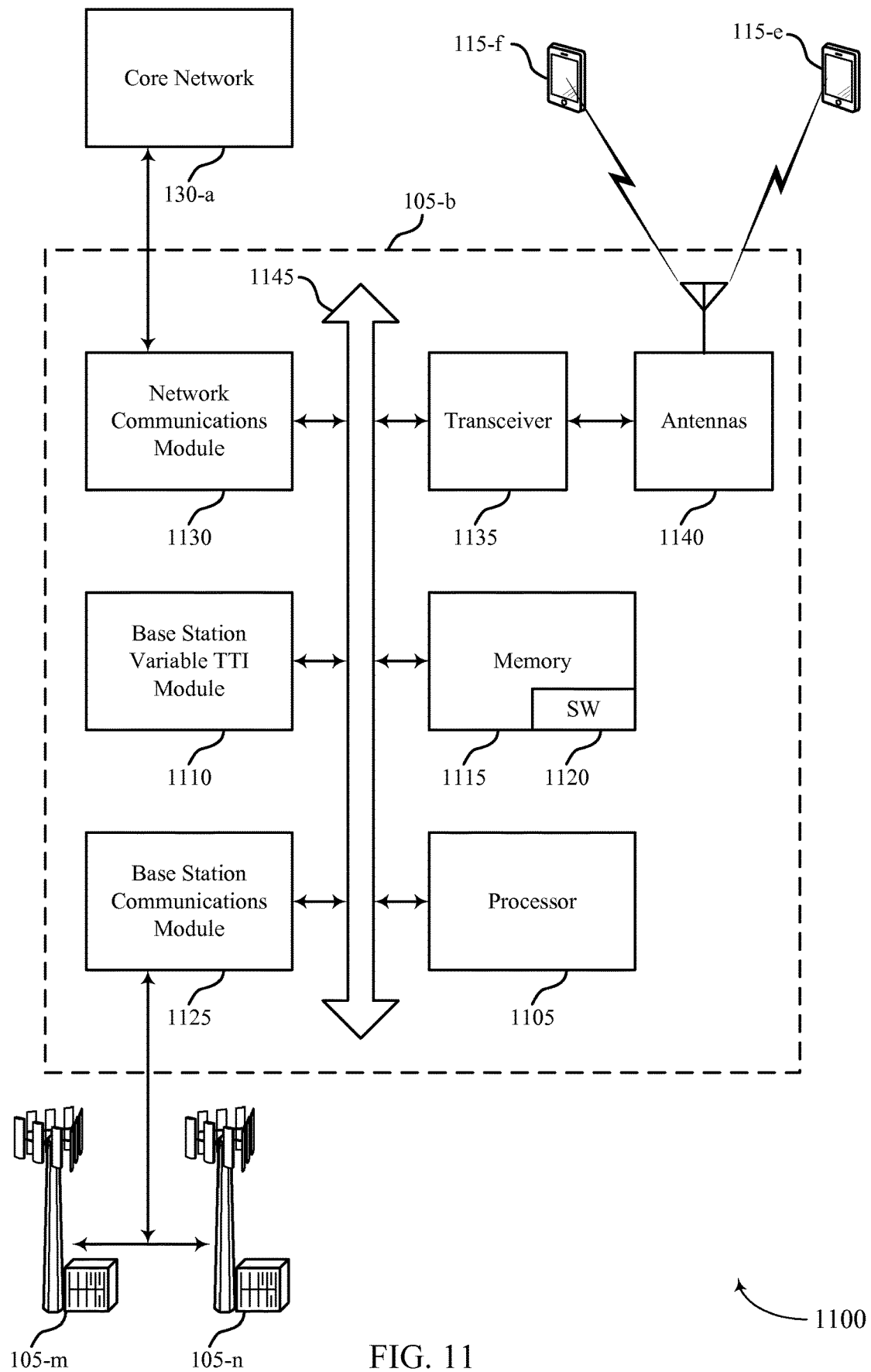
FIG. 11 illustrates a block diagram of a system including a base station configured for variable length TTI in accordance with various aspects of the present disclosure.

FIG. 11 shows a diagram of a system 1100 including a base station 105 configured for variable length TTI in accordance with various aspects of the present disclosure. System 1100 may include base station 105-b, which may be an example of a base station 105 described above with reference to FIG. 1 or 10, and it may be configured to communicate utilizing transmissions as described with reference to FIGS. 2-6. Base Station 105-b may include a base station variable TTI module 1110, which may schedule flexibly and dynamically schedule resource utilizing variable TTI to adapt to traffic needs. Base Station 105-b may also include components for bi-directional voice and data communications including components for transmitting communications and components for receiving communications. For example, base station 105-b may communicate bi-directionally with base station 105-b or base station 105-b.

In some cases, base station 105-b may have one or more wired backhaul links. Base station 105-b may have a wired backhaul link (e.g., S1 interface, etc.) to the core network 130. Base station 105-b may also communicate with other base stations 105, such as base station 105-m and base station 105-n via inter-base station backhaul links (e.g., an X2 interface). Each of the base stations 105 may communicate with UEs 115 using the same or different wireless communications technologies. In some cases, base station 105-b may communicate with other base stations such as 105-m or 105-n utilizing base station communications module 1125. In some embodiments, base station communications module 1125 may provide an X2 interface within an LTE/LTE-A wireless communication network technology to provide communication between some of the base stations 105. In some embodiments, base station 105-b may communicate with other base stations through core network 130-a. In some cases, base station 105-b may communicate with the core network 130 through network communications module 1130.

The base station 105-b may include a processor 1105, memory 1115 (including software (SW) 1120), transceiver 1135, and antenna(s) 1140, which each may be in communication, directly or indirectly, with one another (e.g., over bus system 1145). The transceiver 1135 may be configured to communicate bi-directionally, via the antenna(s) 1140, with the UEs 115, which may be multi-mode devices. The transceiver 1135 (or other components of the base station 105-b) may also be configured to communicate bi-directionally, via the antennas 1140, with one or more other base stations (not shown). The transceiver 1135 may include a modem configured to modulate the packets and provide the modulated packets to the antennas 1140 for transmission, and to demodulate packets received from the antennas 1140. The base station 105-b may include multiple transceivers 1135, each with one or more associated antennas 1140.

The memory 1115 may include RAM and ROM. The memory 1115 may also store computer-readable, computer-executable software code 1120 containing instructions that are configured to, when executed, cause the processor 1105 to perform various functions described herein (e.g., variable length TTI, selecting coverage enhancement techniques, call processing, database management, message routing, etc.). Alternatively, the software code 1120 may not be directly executable by the processor 1105 but be configured to cause the computer, e.g., when compiled and executed, to perform functions described herein. The processor 1105 may include an intelligent hardware device, e.g., a CPU, a microcontroller, an ASIC, etc. The processor 1105 may include various special purpose processors such as encoders, queue processing modules, base band processors, radio head controllers, digital signal processor (DSPs), and the like.

The base station communications module 1125 may manage communications with other base stations 105. The communications management module may include a controller or scheduler for controlling communications with UEs 115 in cooperation with other base stations 105. For example, the base station communications module 1125 may coordinate scheduling for transmissions to UEs 115 for various interference mitigation techniques such as beamforming or joint transmission.

The base station variable TTI module 1110 may, in combination with other components of the base station 105-b, transmit a first grant in a first portion of a variable TTI, where the first portion of the variable TTI includes a control region and a data region, and where the data region is scheduled by the control region. In some examples, the first grant indicates a duration of the variable TTI. The base station 105-b, e.g., via the transceiver 1135, may transmit data on resources of the data region of the first portion of the TTI based, as scheduled utilizing the first grant. The first grant may thus, in some examples, be a downlink grant.

In some examples, the base station 105-b, e.g., via the transceiver 1135, may receive uplink communications on resources of a subsequent TTI that follows a variable TTI. The uplink communications may be based on an uplink grant transmitted in a first portion of the variable TTI. Additionally or alternatively, the base station 105-b, e.g., via the transceiver 1135, may indicate a downlink-to-uplink switching interval to one or several UEs 115 utilizing an uplink grant or common control signaling, or both.

In other examples, the base station 105-b may transmit a downlink grant in a first portion of variable TTI, transmit data during variable TTI, transmit an uplink grant during the variable TTI, and then receive uplink communications (e.g., data, control, etc.) during a subsequent TTI. The base station 105-b may thus transmit data according to a first grant and receive data or control according to a second grant, where both grants are transmitted in the same TTI. In some cases, both grants are transmitted in the same symbol.

Additionally or alternatively, as described with reference to FIG. 6, the base station 105-b may preempt scheduled transmissions with subsequent grants. The base station 105-b may thus assign resources during a certain downlink TTI, and may then preempt that assignment to accommodate delay sensitive traffic which arrives during the previously scheduled TTI.

Figure 12:
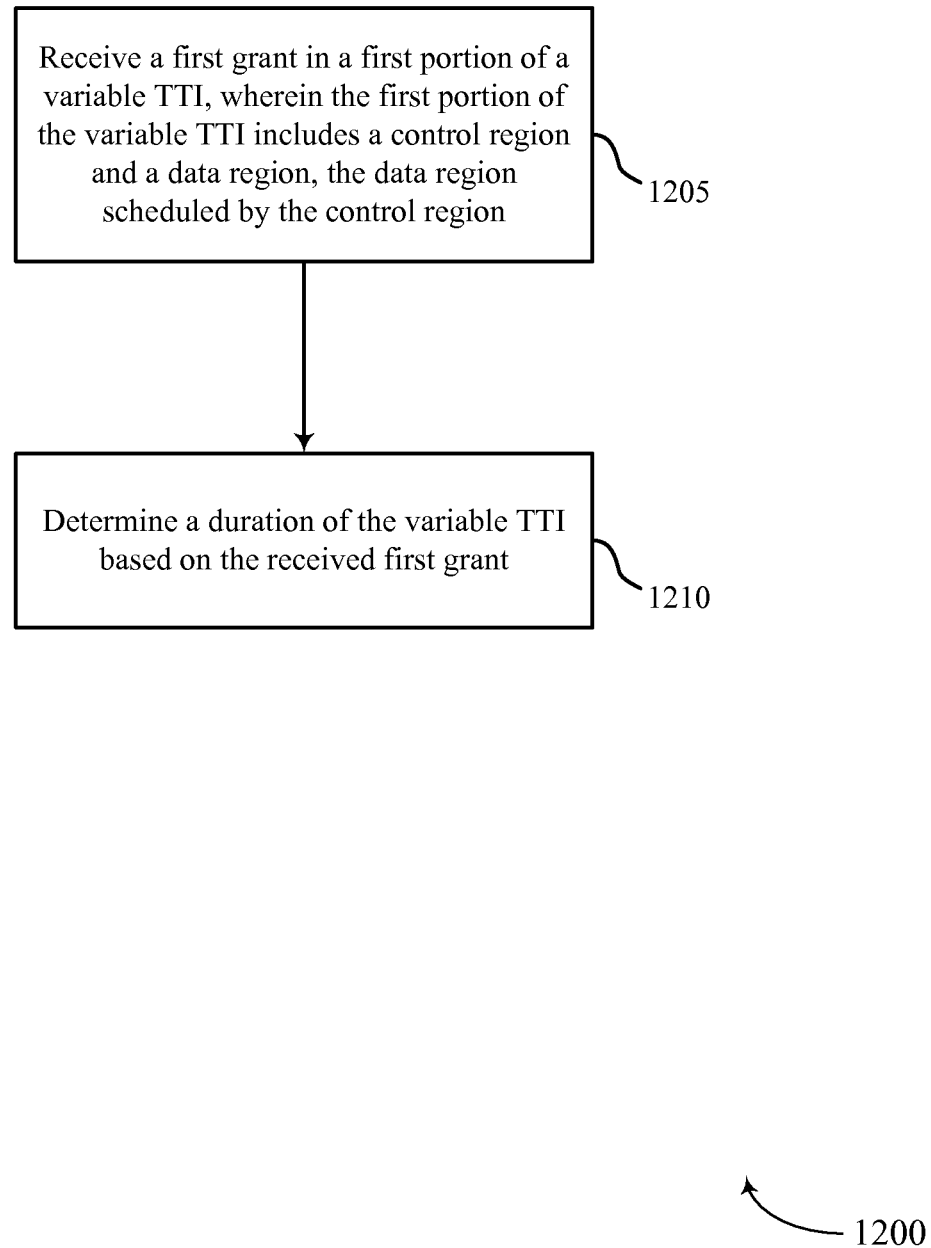
FIG. 12 shows a flowchart illustrating a method for variable length TTI in accordance with various aspects of the present disclosure.

FIG. 12 is a flowchart illustrating a method 1200 for variable length TTI in accordance with various aspects of the present disclosure. The operations of method 1200 may be implemented by a UE 115 or its components, and my employ techniques, as described with reference to FIGS. 1-11. For example, the operations of method 1200 may be performed by the variable TTI module 710 as described with reference to FIGS. 7-11. In some examples, a UE 115 may execute a set of codes to control the functional elements of the UE 115 to perform the functions described below. Additionally or alternatively, the UE 115 may perform aspects the functions described below using special-purpose hardware.

At block 1205, the UE 115 may receive a first grant in a first portion of a variable TTI, where the first portion of the variable TTI includes a control region and a data region, the data region scheduled by the control region, as described above with reference to FIGS. 2-6. In certain examples, the operations of block 1205 may be performed by the receiver 705 and/or associated receivers/antennas as described above with reference to FIGS. 7, 8, 10 and/or by the grant recognition module 805 as described above with reference to FIG. 8. In some examples, the operations of block 1205 may be performed by transceiver 1035 and antennas 1040 of FIG. 10.

At block 1210, the UE 115 may determine a duration of the variable TTI based at least in part on the received first grant, as described above with reference to FIGS. 2-6. In certain examples, the operations of block 1210 may be performed by the TTI duration determination module 810 as described above with reference to FIG. 8. In some examples, the operations of block 1210 may be performed by variable TTI module 1010 of FIG. 10.

Figure 13:
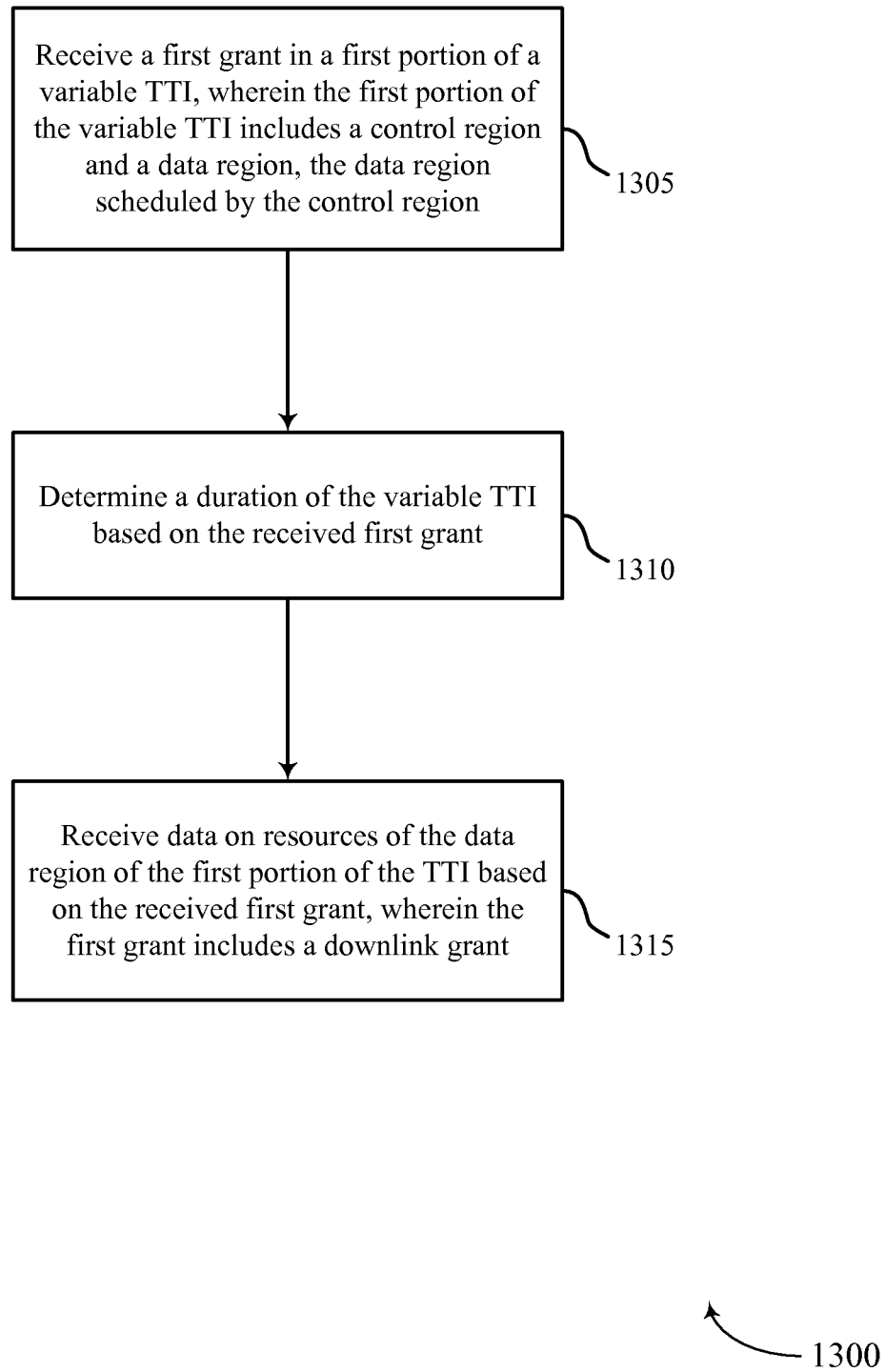
FIG. 13 shows a flowchart illustrating a method for variable length TTI in accordance with various aspects of the present disclosure.

FIG. 13 shows a flowchart illustrating a method 1300 for variable length TTI in accordance with various aspects of the present disclosure. The operations of method 1300 may be implemented by a UE 115 or its components, and my employ techniques, as described with reference to FIGS. 1-11. For example, the operations of method 1300 may be performed by the variable TTI module 710 as described with reference to FIGS. 7-11. In some examples, a UE 115 may execute a set of codes to control the functional elements of the UE 115 to perform the functions described below. Additionally or alternatively, the UE 115 may perform aspects the functions described below using special-purpose hardware. The method 1300 may also incorporate aspects of method 1200 of FIG. 12.

At block 1305, the UE 115 may receive a first grant in a first portion of a variable TTI, wherein the first portion of the variable TTI includes a control region and a data region, the data region scheduled by the control region as described above with reference to FIGS. 2-6. In certain examples, the operations of block 1305 may be performed by the receiver 705 and/or associated receivers/antennas as described above with reference to FIGS. 7, 8, 10 and/or by the grant recognition module 805 as described above with reference to FIG. 8. In some examples, the operations of block 1305 may be performed by transceiver 1035 and antennas 1040.

At block 1310, the UE 115 may determine a duration of the variable TTI based at least in part on the received first grant as described above with reference to FIGS. 2-6. In certain examples, the operations of block 1310 may be performed by the TTI duration determination module 810 as described above with reference to FIG. 8. In some examples, the operations of block 1305 may be performed by variable TTI module 1010 of FIG. 10.

At block 1315, the UE 115 may receive data on resources of the data region of the first portion of the TTI based on the received first grant, wherein the first grant comprises a downlink grant as described above with reference to FIGS. 2-6. In certain examples, the operations of block 1315 may be performed by the receiver 705 and/or associated receivers/antennas as described above with reference to FIGS. 7, 8, 10 and/or by the data region identification module 905 as described above with reference to FIG. 9. In some examples, the operations of block 1315 may be performed by transceiver 1035 and antennas 1040 of FIG. 10.

Figure 14:
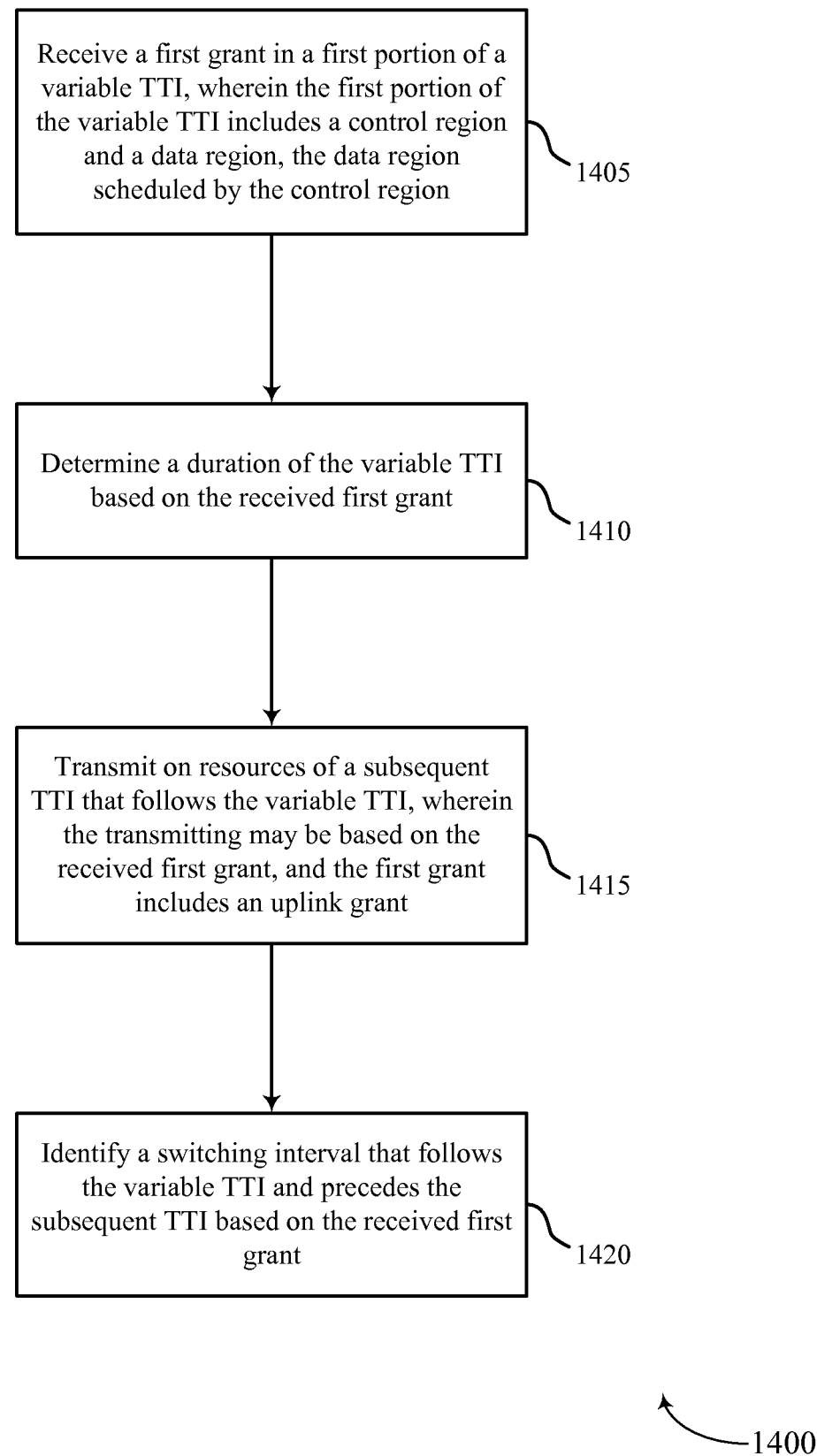
FIG. 14 shows a flowchart illustrating a method for variable length TTI in accordance with various aspects of the present disclosure.

FIG. 14 shows a flowchart illustrating a method 1400 for variable length TTI in accordance with various aspects of the present disclosure. The operations of method 1400 may be implemented by a UE 115 or its components, and my employ techniques, as described with reference to FIGS. 1-11. For example, the operations of method 1400 may be performed by the variable TTI module 710 as described with reference to FIGS. 7-11. In some examples, a UE 115 may execute a set of codes to control the functional elements of the UE 115 to perform the functions described below. Additionally or alternatively, the UE 115 may perform aspects the functions described below using special-purpose hardware. The method 1400 may also incorporate aspects of methods 1200 and 1300 of FIGS. 12 and 13.

At block 1405, the UE 115 may receive a first grant in a first portion of a variable TTI, where the first portion of the variable TTI includes a control region and a data region, and where the data region is scheduled by the control region, as described above with reference to FIGS. 2-6. In certain examples, the operations of block 1405 may be performed by the receiver 705 and/or associated receivers/antennas as described above with reference to FIGS. 7, 8, 10 and/or by the grant recognition module 805 as described above with reference to FIG. 8. In some examples, the operations of block 1405 may be performed by transceiver 1035 and antennas 1040 of FIG. 10.

At block 1410, the UE 115 may determine a duration of the variable TTI based at least in part on the received first grant as described above with reference to FIGS. 2-6. In certain examples, the operations of block 1410 may be performed by the TTI duration determination module 810 as described above with reference to FIG. 8. In some examples the operations of block 1410 may be performed by variable TTI module 1010.

At block 1415, the UE 115 may transmit on resources of a subsequent TTI that follows the variable TTI, wherein the transmitting is based on the received first grant, and the first grant comprises an uplink grant as described above with reference to FIGS. 2-6. In certain examples, the operations of block 1415 may be performed by the transmitter 715 and/or associated transmitters/antennas as described above with reference to FIGS. 7, 8, 10 and/or by the uplink resource determination module 910 as described above with reference to FIG. 9. In some examples, the operations of block 1415 may be performed by transceiver 1035 and antennas 1040 of FIG. 10.

At block 1420, the UE 115 may identify a switching interval that follows the variable TTI and precedes the subsequent TTI, based on the received first grant, as described above with reference to FIGS. 2-6. In certain examples, the operations of block 1420 may be performed by the switching interval identification module 915 as described above with reference to FIG. 9.

Figure 15:
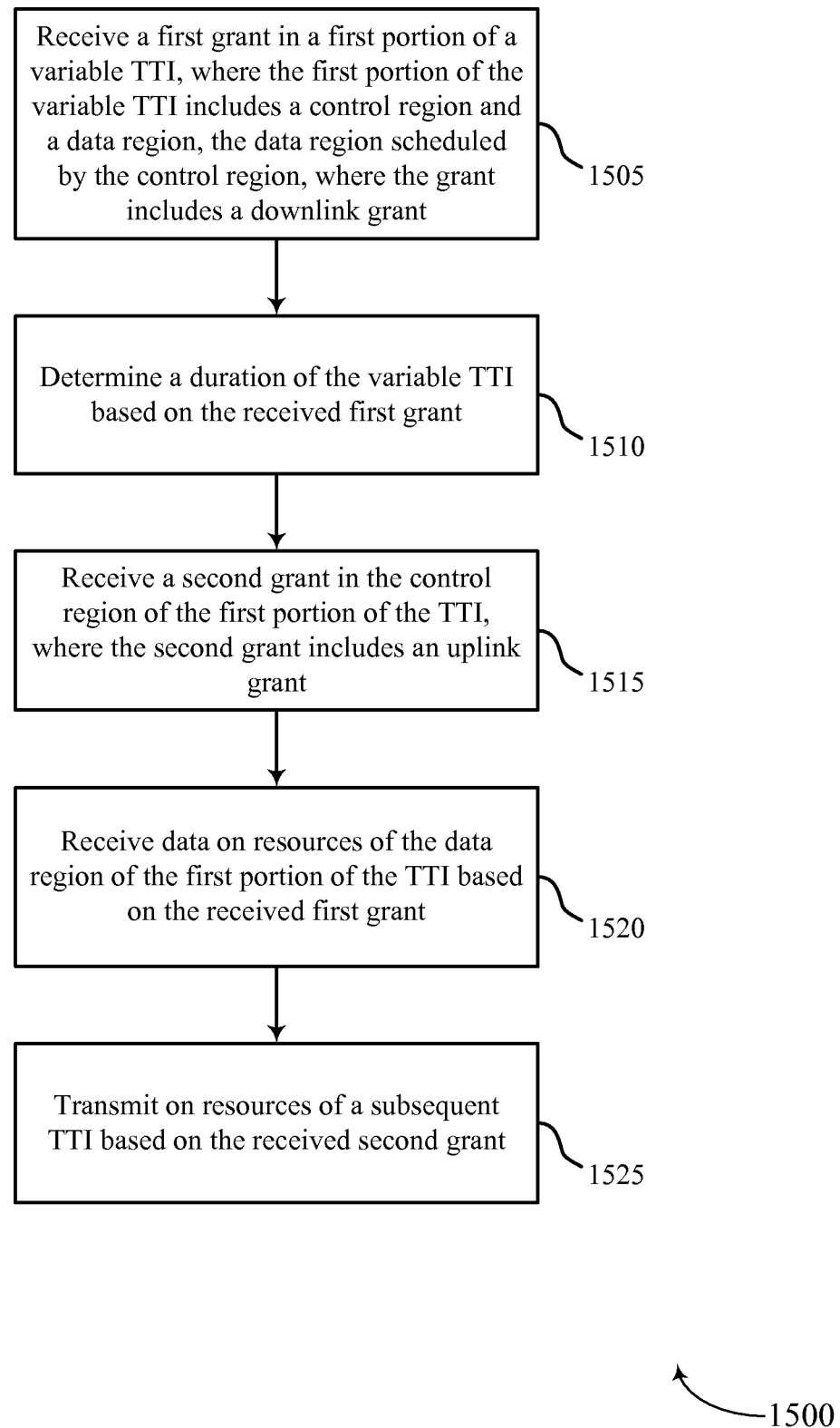
FIG. 15 shows a flowchart illustrating a method for variable length TTI in accordance with various aspects of the present disclosure.

FIG. 15 shows a flowchart illustrating a method 1500 for variable length TTI in accordance with various aspects of the present disclosure. The operations of method 1500 may be implemented by a UE 115 or its components, and my employ techniques, as described with reference to FIGS. 1-11. For example, the operations of method 1500 may be performed by the variable TTI module 710 as described with reference to FIGS. 7-11. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of methods 1200, 1300, and 1400 of FIGS. 12-14.

At block 1505, the UE 115 may receive a first grant in a first portion of a variable TTI, where the first portion of the variable TTI includes a control region and a data region, and where the data region scheduled by the control region, as described above with reference to FIGS. 2-6. In some cases, the first grant includes a downlink grant. In certain examples, the operations of block 1505 may be performed by the receiver 705 and/or associated receivers/antennas as described above with reference to FIGS. 7, 8, 10 and/or by the grant recognition module 805 as described above with reference to FIG. 8. In some examples, the operations of block 1505 may be performed by transceiver 1035 and antennas 1040 of FIG. 10.

At block 1510, the UE 115 may determine a duration of the variable TTI based at least in part on the received first grant as described above with reference to FIGS. 2-6. In certain examples, the operations of block 1510 may be performed by the TTI duration determination module 810 as described above with reference to FIG. 8. In some examples, the operations of block 1510 may be performed by variable TTI module 1010 of FIG. 10.

At block 1515, the UE 115 may receive a second grant in the control region of the first portion of the TTI as described above with reference to FIGS. 2-6. In some cases, the second grant includes an uplink grant. In certain examples, the operations of block 1515 may be performed by the receiver 705 and/or associated receivers/antennas as described above with reference to FIGS. 7, 8, 10 and/or by the control region identification module 920 as described above with reference to FIG. 9. In some examples, the operations of block 1515 may be performed by transceiver 1035 and antennas 1040 of FIG. 10.

At block 1520, the UE 115 may receive data on resources of the data region of the first portion of the TTI based on the received first grant as described above with reference to FIGS. 2-6. In certain examples, the operations of block 1520 may be performed by the receiver 705 and/or associated receivers/antennas as described above with reference to FIGS. 7, 8, 10 and/or by the data region identification module 905 as described above with reference to FIG. 9. In some examples, the operations of block 1520 may be performed by transceiver 1035 and antennas 1040 of FIG. 10.

At block 1525, the UE 115 may transmit on resources of a subsequent TTI based on the received second grant as described above with reference to FIGS. 2-6. In certain examples, the operations of block 1525 may be performed by the transmitter 715 and/or associated transmitters/antennas as described above with reference to FIGS. 7, 8, 10 and/or by the uplink resource determination module 910 as described above with reference to FIG. 9. In some examples, the operations of block 1525 may be performed by transceiver 1035 and antennas 1040 of FIG. 10.

Figure 16:
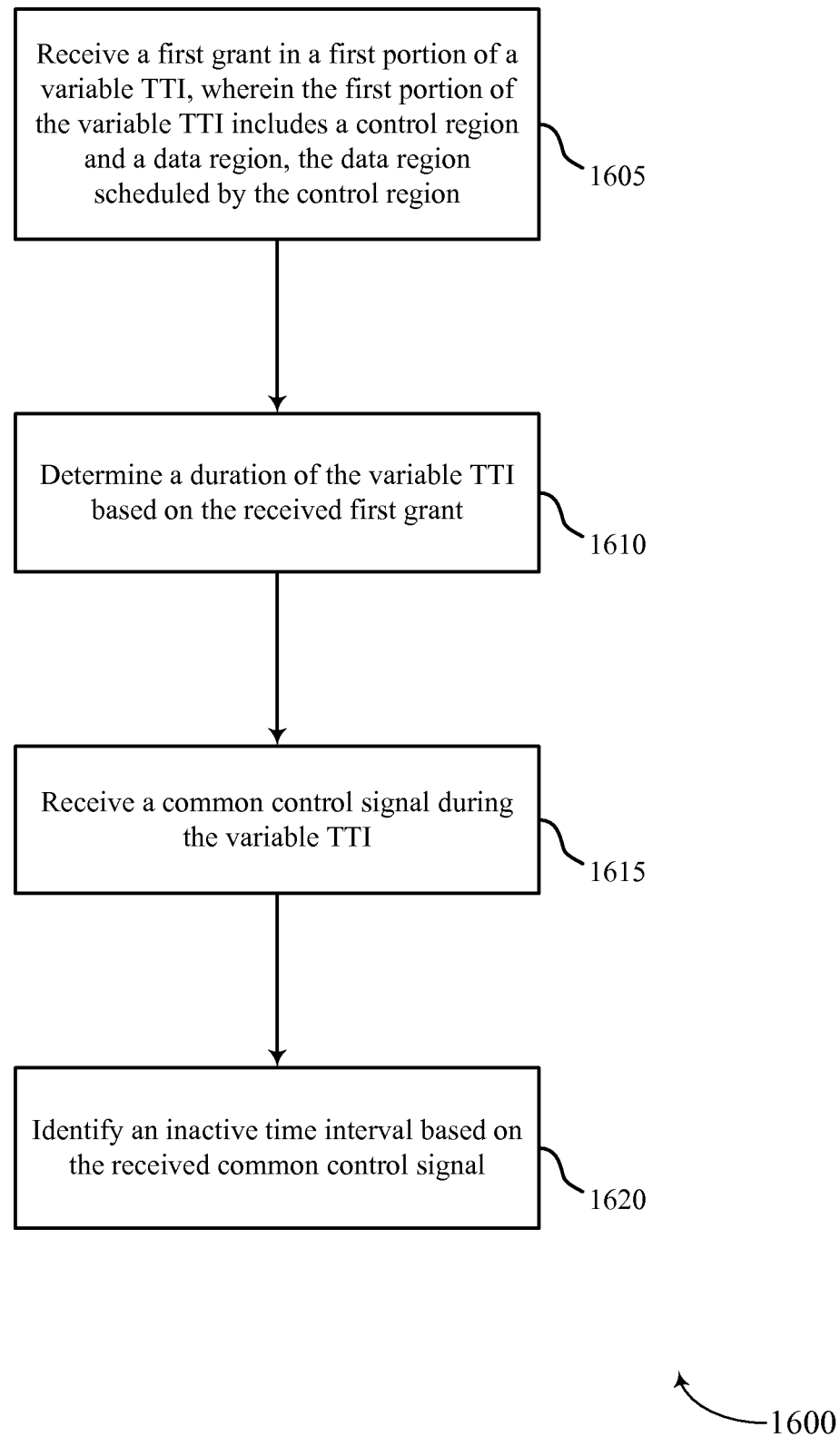
FIG. 16 shows a flowchart illustrating a method for variable length TTI in accordance with various aspects of the present disclosure.

FIG. 16 shows a flowchart illustrating a method 1600 for variable length TTI in accordance with various aspects of the present disclosure. The operations of method 1600 may be implemented by a UE 115 or its components, and my employ techniques, as described with reference to FIGS. 1-11. For example, the operations of method 1600 may be performed by the variable TTI module 710 as described with reference to FIGS. 7-11. In some examples, a UE 115 may execute a set of codes to control the functional elements of the UE 115 to perform the functions described below. Additionally or alternatively, the UE 115 may perform aspects the functions described below using special-purpose hardware. The method 1600 may also incorporate aspects of methods 1200, 1300, 1400, and 1500 of FIGS. 12-15.

At block 1605, the UE 115 may receive a first grant in a first portion of a variable TTI, where the first portion of the variable TTI includes a control region and a data region, and where the data region scheduled by the control region as described above with reference to FIGS. 2-6. In certain examples, the operations of block 1605 may be performed by the receiver 705 and/or associated receivers/antennas as described above with reference to FIGS. 7, 8, 10 and/or by the grant recognition module 805 as described above with reference to FIG. 8. In some examples, the operations of block 1605 may be performed by transceiver 1035 and antennas 1040 of FIG. 10.

At block 1610, the UE 115 may determine a duration of the variable TTI based at least in part on the received first grant as described above with reference to FIGS. 2-6. In certain examples, the operations of block 1610 may be performed by the TTI duration determination module 810 as described above with reference to FIG. 8. In some examples, the operations of block 1610 may be performed by variable TTI module 1010.

At block 1615, the UE 115 may receive a common control signal during the variable TTI as described above with reference to FIGS. 2-6. In certain examples, the operations of block 1615 may be performed by the receiver 705 and/or associated receivers/antennas as described above with reference to FIGS. 7, 8, 10 and/or by the control signal recognition module 925 as described above with reference to FIG. 9. In some examples, the operations of block 1615 may be performed by transceiver 1035 and antennas 1040 of FIG. 10.

At block 1620, the UE 115 may identify an inactive time interval based on the received common control signal as described above with reference to FIGS. 2-6. In certain examples, the operations of block 1620 may be performed by the sleep time determination module 930 as described above with reference to FIG. 9. In some examples, the operations of block 1620 may be performed by variable TTI module 1010 of FIG. 10.

Figure 17:
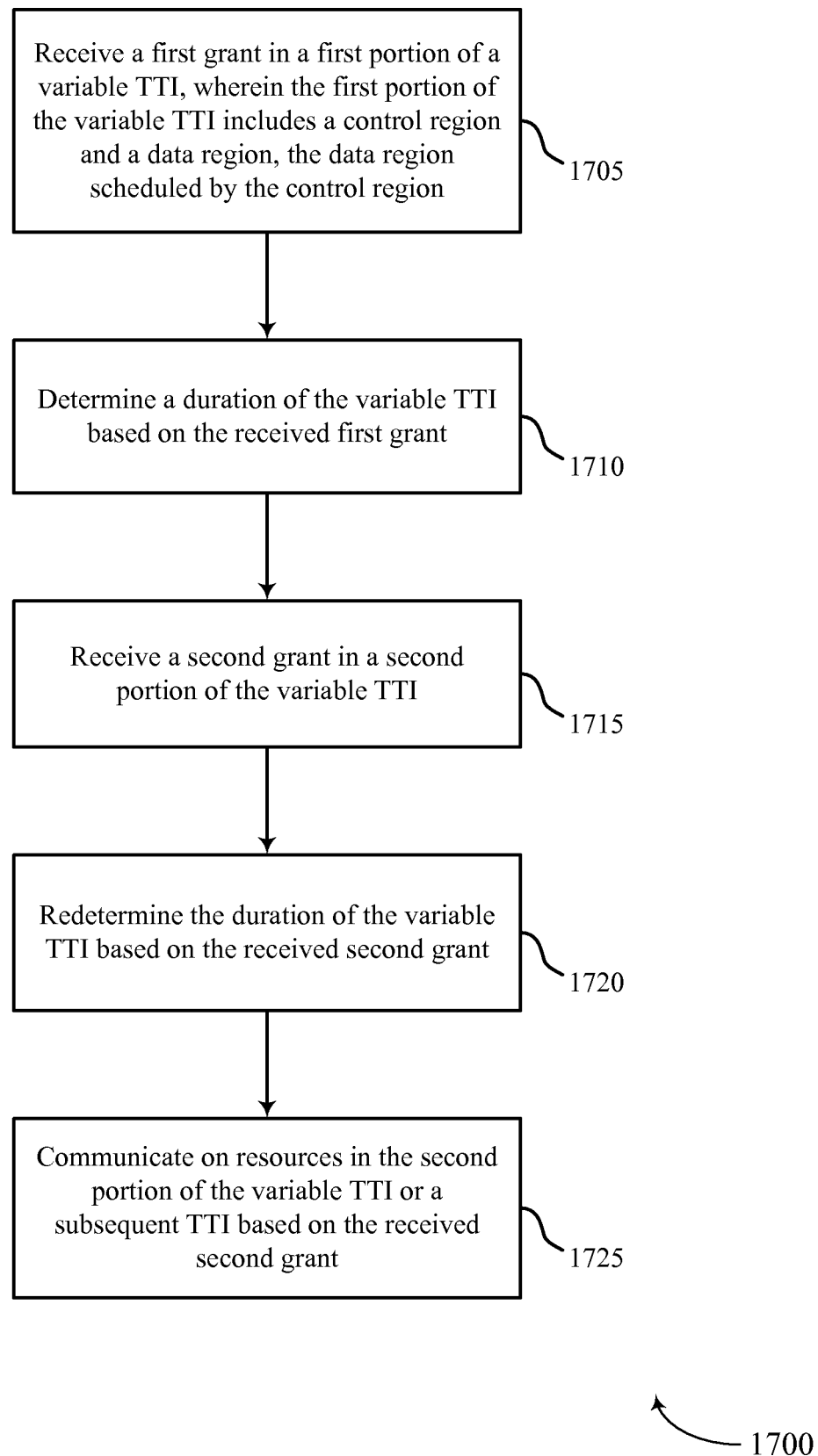
FIG. 17 shows a flowchart illustrating a method for variable length TTI in accordance with various aspects of the present disclosure.

FIG. 17 shows a flowchart illustrating a method 1700 for variable length TTI in accordance with various aspects of the present disclosure. The operations of method 1700 may be implemented by a UE 115 or its components, and my employ techniques, as described with reference to FIGS. 1-11. For example, the operations of method 1700 may be performed by the variable TTI module 710 as described with reference to FIGS. 7-11. In some examples, a UE 115 may execute a set of codes to control the functional elements of the UE 115 to perform the functions described below. Additionally or alternatively, the UE 115 may perform aspects the functions described below using special-purpose hardware. The method 1700 may also incorporate aspects of methods 1200, 1300, 1400, 1500, and 1600 of FIGS. 12-16.

At block 1705, the UE 115 may receive a first grant in a first portion of a variable TTI, where the first portion of the variable TTI includes a control region and a data region, the data region scheduled by the control region as described above with reference to FIGS. 2-6. In certain examples, the operations of block 1705 may be performed by the receiver 705 and/or associated receivers/antennas as described above with reference to FIGS. 7, 8, 10 and/or by the grant recognition module 805 as described above with reference to FIG. 8. In some examples, the operations of block 1705 may be performed by transceiver 1035 and antennas 1040 of FIG. 10.

At block 1710, the UE 115 may determine a duration of the variable TTI based at least in part on the received first grant as described above with reference to FIGS. 2-6. In certain examples, the operations of block 1710 may be performed by the TTI duration determination module 810 as described above with reference to FIG. 8. In some examples, the operations of block 1710 may be performed by variable TTI module 1010 of FIG. 10.

At block 1715, the UE 115 may receive a second grant in a second portion of the variable TTI as described above with reference to FIGS. 2-6. In certain examples, the operations of block 1715 may be performed by the receiver 705 and/or associated receivers/antennas as described above with reference to FIGS. 7, 8, 10 and/or by the grant recognition module 805 as described above with reference to FIG. 8. In some examples, the operations of block 1715 may be performed by transceiver 1035 and antennas 1040 of FIG. 10.

At block 1720, the UE 115 may redetermine the duration of the variable TTI based on the received second grant as described above with reference to FIGS. 2-6. In certain examples, the operations of block 1720 may be performed by the TTI duration determination module 810 as described above with reference to FIG. 8. In some examples, the operations of block 1720 may be performed by At block 1725, the UE 115 may communicate on resources in the second portion of the variable TTI or a subsequent TTI based on the received second grant as described above with reference to FIGS. 2-6. In certain examples, the operations of block 1725 may be performed by the transmitter 715 and/or associated transmitters/antennas as described above with reference to FIGS. 7, 8, 10 and/or by the uplink resource determination module 910 as described above with reference to FIG. 9. In some examples, the operations of block 1725 may be performed by transceiver 1035 and antennas 1040 of FIG. 10.

Thus, methods 1200, 1300, 1400, 1500, 1600, and 1700 may provide for variable length TTI. It should be noted that methods 1200, 1300, 1400, 1500, 1600, and 1700 describe possible implementation, and that the operations and the steps may be rearranged or otherwise modified such that other implementations are possible. In some examples, aspects from two or more of the methods 1200, 1300, 1400, 1500, 1600, and 1700 may be combined.

The detailed description set forth above in connection with the appended drawings describes example embodiments and does not represent all the embodiments that may be implemented or that are within the scope of the claims. The term "exemplary," as used in this description, means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication at a user equipment (UE), comprising:
receiving an allocation of resources of a variable duration transmission time interval (TTI) for the UE, wherein the received allocation of resources comprises an indication of a duration of the variable duration TTI; and
determining, based at least in part on receiving the allocation of resources of the variable duration TTI for the UE, the duration of the variable duration TTI based at least in part on the indication.

2. The method of claim 1, wherein the allocation of resources comprises a downlink grant received in a first portion of the variable duration TTI, the method further comprising:
receiving data on resources of a data region of the first portion of the variable duration TTI based at least in part on the downlink grant.

3. The method of claim 1, wherein the allocation of resources comprises an uplink grant received in a first variable duration TTI and indicating an allocation of resources of a second variable duration TTI that follows the first variable duration TTI, the method further comprising:
transmitting on resources of the second variable duration TTI based at least in part on the uplink grant.

4. The method of claim 3, further comprising:
identifying a switching interval that follows the first variable duration TTI and precedes the second variable duration TTI based at least in part on the received allocation of resources.

5. The method of claim 1, further comprising:
receiving, in a control region of a first portion of the variable duration TTI, a second allocation of resources for the UE;
receiving data on resources of a data region of the first portion of the variable duration TTI based at least in part on the allocation of resources; and
transmitting on resources of a subsequent TTI based at least in part on the second allocation of resources.

6. The method of claim 1, further comprising:
receiving a common control signal during the variable duration TTI;
identifying an inactive time interval based at least in part on the received common control signal; and
initiating a sleep cycle upon identifying the inactive time interval.

7. The method of claim 2, wherein
the first portion of the variable duration TTI comprises a set of symbol periods, and wherein the variable duration TTI comprises one symbol period of the set.

8. The method of claim 1, wherein the allocation of resources is received in a first portion of the variable duration TTI, the method further comprising:
receiving a second allocation of resources in a second portion of the variable duration TTI, wherein the second allocation of resources preempts the allocation of resources and comprises an indication of a new duration of the variable duration TTI;
determining, based at least in part on receiving the second allocation of resources in the second portion of the variable duration TTI, the new duration of the variable duration TTI based at least in part on the indication; and
communicating on resources in the second portion of the variable duration TTI or a subsequent TTI based at least in part on the second allocation of resources.

9. The method of claim 8, wherein the variable duration TTI comprises a set of symbol periods, and wherein the first and second portions of the variable duration TTI each comprise one symbol of the set of symbol periods.

10. The method of claim 1, wherein the allocation of resources comprises one of a set of downlink or uplink grants.

11. The method of claim 1, further comprising:
determining a hybrid automatic repeat request (HARQ) timing based at least in part on the duration of the variable duration TTI.

12. An apparatus for wireless communication at a user equipment (UE), comprising:
means for receiving an allocation of resources of a variable duration transmission time interval (TTI) for the UE, wherein the received allocation of resources comprises an indication of a duration of the variable duration TTI; and
means for determining, based at least in part on receiving the allocation of resources of the variable duration TTI for the UE, the duration of the variable duration TTI based at least in part on the indication.

13. The apparatus of claim 12, wherein the allocation of resources comprises a downlink grant received in a first portion of the variable duration TTI, the apparatus further comprising:
means for receiving data on resources of a data region of the first portion of the variable duration TTI based at least in part on the downlink grant.

14. The apparatus of claim 12, wherein the allocation of resources comprises an uplink grant received in a first variable duration TTI and indicating an allocation of resources of a second variable duration TTI that follows the first variable duration TTI, the apparatus further comprising:
means for transmitting on resources of the second variable duration TTI based at least in part on the uplink grant.

15. The apparatus of claim 14, further comprising:
means for identifying a switching interval that follows the first variable duration TTI and precedes the second variable duration TTI based at least in part on the received allocation of resources.

16. The apparatus of claim 12, further comprising:
means for receiving, in a control region of a first portion of the variable duration TTI, a second allocation of resources for the UE;
means for receiving data on resources of a data region of the first portion of the variable duration TTI based at least in part on the allocation of resources; and
means for transmitting on resources of a subsequent TTI based at least in part on the second allocation of resources.

17. The apparatus of claim 12, further comprising:
means for receiving a common control signal during the variable duration TTI;
means for identifying an inactive time interval based at least in part on the received common control signal; and
means for initiating a sleep cycle upon identifying the inactive time interval.

18. The apparatus of claim 12, further comprising:
means for receiving a second allocation of resources in a second portion of the variable duration TTI, wherein the second allocation of resources preempts the allocation of resources and comprises an indication of a new duration of the variable duration TTI;
means for determining, based at least in part on receiving the second allocation of resources in the second portion of the variable duration TTI, the new duration of the variable duration TTI based at least in part on the indication; and
means for communicating on resources in the second portion of the variable duration TTI or a subsequent TTI based at least in part on the second allocation of resources.

19. An apparatus for wireless communication at a user equipment (UE), comprising:
a processor;
memory in electronic communication with the processor; and
instructions stored in the memory, wherein the instructions are executable by the processor to:
receive an allocation of resources of a variable duration transmission time interval (TTI) for the UE, wherein the received allocation of resources comprises an indication of a duration of the variable duration TTI; and
determine, based at least in part on receiving the allocation of resources of the variable duration TTI for the UE, the duration of the variable duration TTI based at least in part on the indication.

20. The apparatus of claim 19, wherein the allocation of resources comprises a downlink grant received in a first portion of the variable duration TTI, and the instructions are executable by the processor to:

receive data on resources of a data region of the first portion of the variable duration TTI based at least in part on the downlink grant.

21. The apparatus of claim 19, wherein the allocation of resources comprises an uplink grant received in a first variable duration TTI and indicating an allocation of resources of a second variable duration TTI that follows the first variable duration TTI, and the instructions are executable by the processor to:

transmit on resources of the second variable duration TTI based at least in part on the uplink grant.

22. The apparatus of claim 21, wherein the instructions are executable by the processor to:

identify a switching interval that follows the first variable duration TTI and precedes the second variable duration TTI based at least in part on the received allocation of resources.

23. The apparatus of claim 19, wherein the instructions are executable by the processor to:

receive, in a control region of a first portion of the variable duration TTI, a second allocation of resources for the UE;

receive data on resources of a data region of the first portion of the variable duration TTI based at least in part on the allocation of resources; and transmit on resources of a subsequent TTI based at least in part on the second allocation of resources.

24. The apparatus of claim 19, wherein the instructions are executable by the processor to:

receive a common control signal during the variable duration TTI;

identify an inactive time interval based at least in part on the received common control signal; and initiate a sleep cycle upon identifying the inactive time interval.

25. The apparatus of claim 20, wherein the first portion of the variable duration TTI comprises a set of symbol periods, and wherein the variable duration TTI comprises one symbol period of the set.

26. The apparatus of claim 19, wherein the allocation of resources is received in a first portion of the variable duration TTI, and the instructions are executable by the processor to:

receive a second allocation of resources in a second portion of the variable duration TTI, wherein the second allocation of resources preempts the allocation of resources and comprises an indication of a new duration of the variable duration TTI;

determine, based at least in part on receiving the second allocation of resources in the second portion of the variable duration TTI, the new duration of the variable duration TTI based at least in part on the indication of the new duration of the second allocation of resources; and communicate on resources in the second portion of the variable duration TTI or a subsequent TTI based at least in part on the second allocation of resources.

27. The apparatus of claim 26, wherein the variable duration TTI comprises a set of symbol periods, and wherein the first and second portions of the variable duration TTI each comprise one symbol period of the set of symbol periods.

28. The apparatus of claim 19, wherein the allocation of resources comprises one of a set of downlink or uplink grants.

29. The apparatus of claim 19, wherein the instructions are executable by the processor to:

determine a hybrid automatic repeat request (HARQ) timing based at least in part on the duration of the variable duration TTI.

30. A non-transitory computer-readable medium storing code for wireless communication at a user equipment (UE), the code comprising instructions executable to:

receive an allocation of resources of a variable duration transmission time interval (TTI) for the UE, wherein the received allocation of resources comprises an indication of a duration of the variable duration TTI; and determine, based at least in part on receiving the allocation of resources of the variable duration TTI for the UE, the duration of the variable duration TTI based at least in part on the indication.

* * * * *